(12) United States Patent
Turner

(10) Patent No.: US 8,532,978 B1
(45) Date of Patent: Sep. 10, 2013

(54) NATURAL LANGUAGE INTERFACE, COMPILER AND DE-COMPILER FOR SECURITY POLICIES

(75) Inventor: Ronald C Turner, Spokane, WA (US)

(73) Assignee: AFRL/RIJ, Rome, NY (US)

( * ) Notice: Subject to any disclaimer, the term of this patent is extended or adjusted under 35 U.S.C. 154(b) by 1149 days.

(21) Appl. No.: 12/263,307

(22) Filed: Oct. 31, 2008

(51) Int. Cl.
*G06F 17/28* (2006.01)
*G06F 17/20* (2006.01)
*G06F 17/27* (2006.01)
*G06F 17/21* (2006.01)
*G10L 21/00* (2013.01)

(52) U.S. Cl.
USPC .............. 704/9; 704/2; 704/4; 704/7; 704/8; 704/10; 704/270; 704/270.1; 704/275

(58) Field of Classification Search
USPC .................. 704/9, 10, 2, 4, 7, 8, 270, 270.1, 704/275; 707/752, 769, 999.007, 9, 763, 707/736, 757; 726/1, 4, 20
See application file for complete search history.

(56) References Cited

U.S. PATENT DOCUMENTS

| | | | |
|---|---|---|---|
| 7,921,452 B2 * | 4/2011 | Ridlon et al. | 726/1 |
| 8,117,640 B1 * | 2/2012 | Moriconi et al. | 726/1 |
| 2003/0115322 A1 * | 6/2003 | Moriconi et al. | 709/224 |
| 2003/0225700 A1 * | 12/2003 | Lao et al. | 705/51 |
| 2004/0230835 A1 * | 11/2004 | Goldfeder et al. | 713/201 |
| 2005/0166260 A1 * | 7/2005 | Betts et al. | 726/4 |
| 2005/0262487 A1 * | 11/2005 | Pistoia et al. | 717/143 |
| 2006/0041421 A1 * | 2/2006 | Ta et al. | 704/5 |
| 2006/0107313 A1 * | 5/2006 | Crowley et al. | 726/6 |
| 2007/0056018 A1 * | 3/2007 | Ridlon et al. | 726/1 |
| 2007/0156659 A1 * | 7/2007 | Lim | 707/3 |
| 2007/0157288 A1 * | 7/2007 | Lim | 726/1 |
| 2007/0169168 A1 * | 7/2007 | Lim | 726/1 |
| 2007/0180490 A1 * | 8/2007 | Renzi et al. | 726/1 |
| 2008/0066160 A1 * | 3/2008 | Becker et al. | 726/4 |
| 2008/0066171 A1 * | 3/2008 | Becker et al. | 726/9 |
| 2008/0086758 A1 * | 4/2008 | Chowdhury et al. | 726/2 |
| 2008/0127292 A1 * | 5/2008 | Cooper et al. | 726/1 |
| 2010/0153695 A1 * | 6/2010 | Bussard et al. | 713/1 |
| 2012/0124643 A1 * | 5/2012 | Moriconi et al. | 726/1 |
| 2012/0159577 A1 * | 6/2012 | Belinkiy et al. | 726/4 |

OTHER PUBLICATIONS

F. C. Alex X. Liu, "Xengine: A fast and scalable xacml policy evaluation engine," Department of Computer Science, Michigan State University, East Lansing, Michigan, Tech. Rep. MSU-CSE-08-2, Mar. 2008.*

* cited by examiner

*Primary Examiner* — Edgar Guerra-Erazo
(74) *Attorney, Agent, or Firm* — Senniger Powers LLP

(57) ABSTRACT

A method and system for enabling non-programmers to create certifiable Extensible Access Control Markup Language (XACML) policies. The graphical user interface (GUI) presents a form to the security policy author using a natural language such as English, as specified by a context-free grammar. The compiler software translates the GUI's filled-in form—representing a human-readable natural language policy—into XACML code. A reverse compiler or de-compiler provides a certification of the XACML code to render the original policy in a natural language format such as English. Optionally, a tokenized intermediate form, a set of policy-specific data sets and a graph theory-based intermediate representation can be configured. Logic checks and code validation checks can be also preferably configured. Apparatus and medium claims are also provided.

14 Claims, 19 Drawing Sheets

```
IF this-data's-roles INCLUDES this-user's-role
  AND
  IF this-user's-role AND this-user's-clearance-level VALID
    AND
    IF this-data's-classification NOT EXCEEDS this-user's-clearance level
    AND
      IF this-data's-classification NOT EXCEEDS this-medium's-classification
      AND
      IF this-data's-classification NOT EXCEEDS this-facility's-classification
THEN
    Log Delivery
    Release data
ELSE
    Log failure (including reason)
    Notify user/service of failure (w/o reason)
```

```
IF #this-data's-roles XACML:set contain #this-user's-roles
  AND
  IF #this-data's-classification <=#this-facility's-classification
    AND
    IF #this-data's-classification <= #this-medium's-classification
      AND
      IF #this-data's-classification <= #this-user's-clearance level
        AND
        IF #this-user's-need-to-know >= #this-data's classification
THEN
    XACML: Grant Access
    !Log Access
ELSE
    XACML: Deny Access
    !Log denial
```

FIG. 18

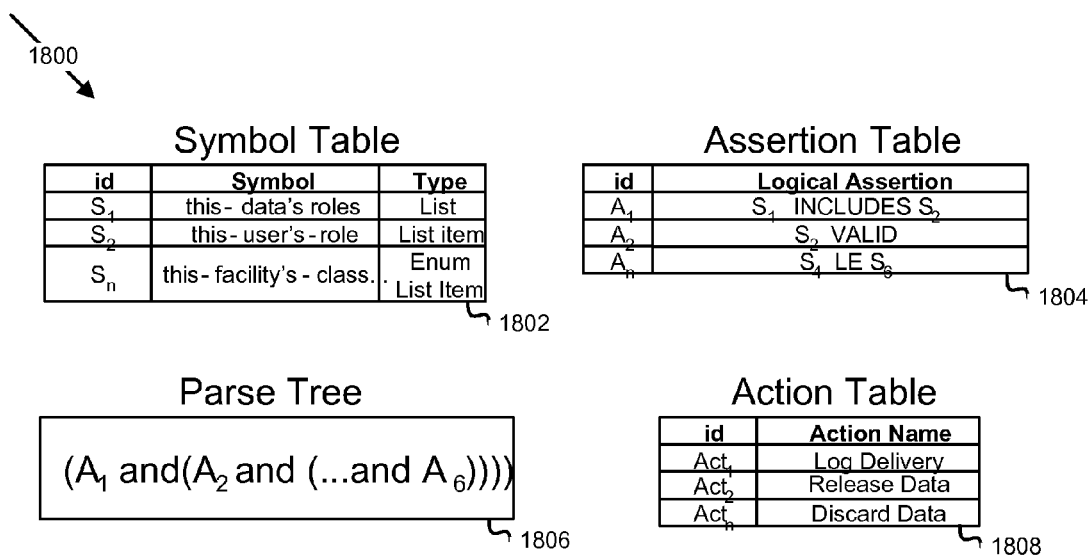

FIG. 19

```
<?xml version="1.0" encoding="UTF-8"?>
<Policy
 :
 <Target>
  <Subjects>
   <Subject>
    <SubjectMatch
MatchId="urn:oasis:names:tc:xacml:1.0:function:rfc822Name-match">
     <AttributeValue DataType="http://www.w3.org/2001/
XMLSchema#string">soph-ware.com</AttributeValue>
     <SubjectAttributeDesignator
DataType="urn:oasis:names:tc:xacml:1.0:data-type:rfc822Name"
     :
    </SubjectMatch>
   </Subject>
  </Subjects>
  <Resources>
```

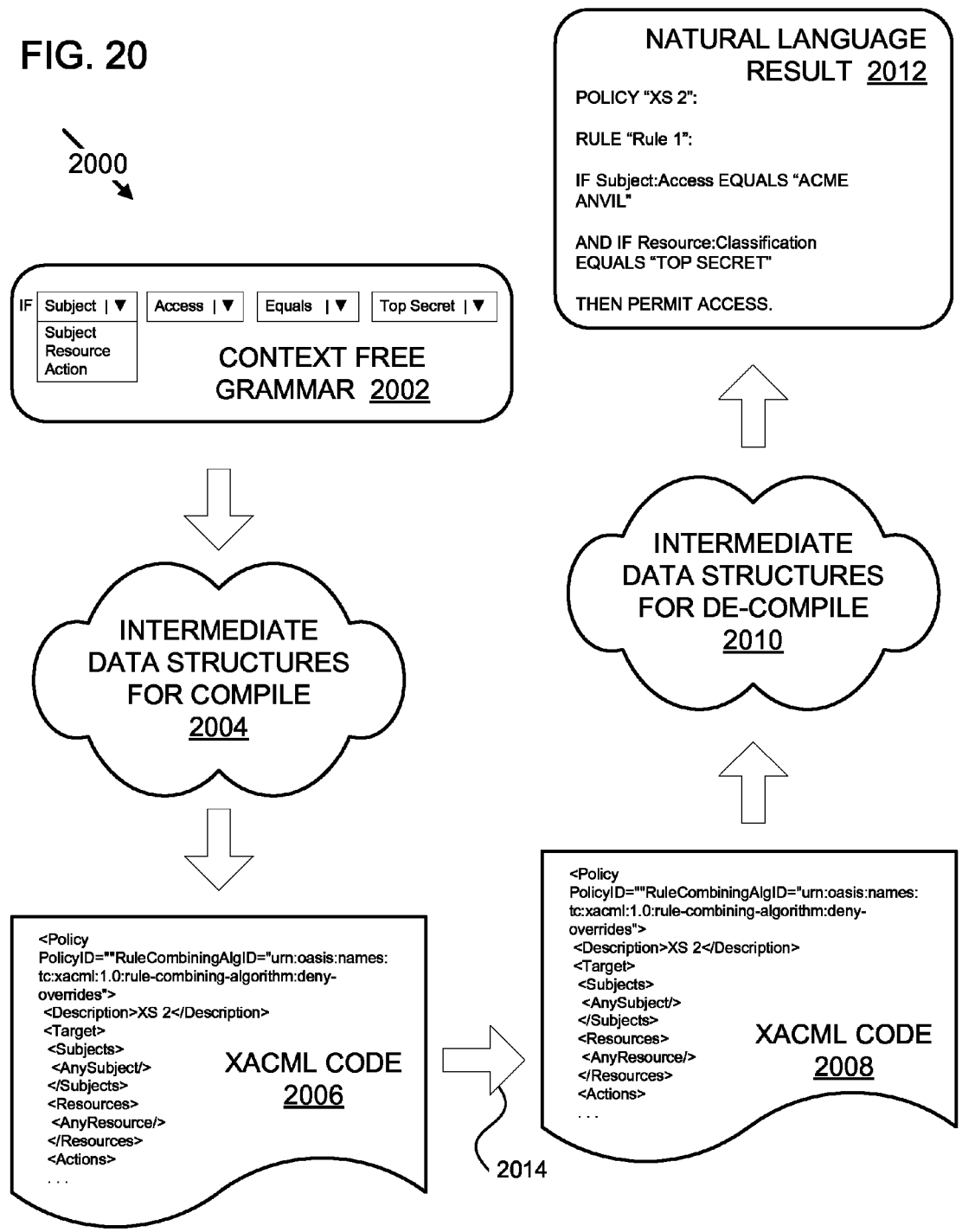

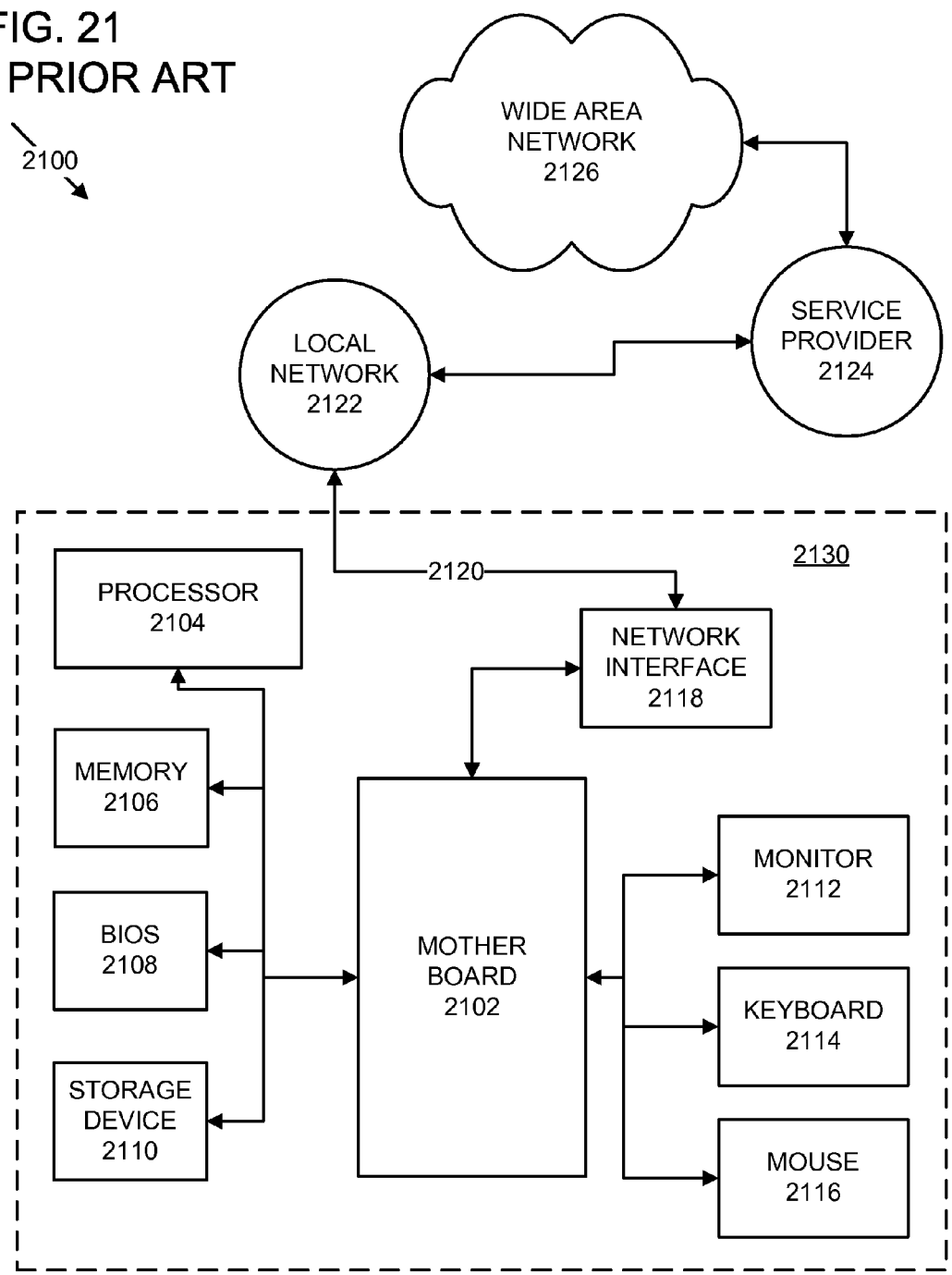

NATURAL LANGUAGE INTERFACE, COMPILER AND DE-COMPILER FOR SECURITY POLICIES

GOVERNMENT SUPPORT UNDER CONTRACT

This invention was made with Government support under FA8750-05-C-0063 awarded by the U.S. Air Force. The Government has certain rights in the invention.

TECHNICAL FIELD

The present invention pertains to the creation of standards-compliant security rules for accessing secure and private data. More particularly, preferred embodiments of the present invention create, compile, and de-compile XACML policies utilizing a near natural language interface in a manner that safely eliminates the need for programming skills and expert knowledge of XACML.

BACKGROUND

An important use of computers in modern times is the dissemination of information across a wide area network. Currently, the largest wide area computer network in existence is the Internet, although additional world-wide networks similar to the Internet are presently under development and deployment. The Internet is a complex interconnection of computers and networks that communicate using a common protocol, TCP/IP, originating in the 1960s by the U.S. Defense Department. For a long time, the Internet was used by researchers in universities and national laboratories to share data and information. Today, hundreds of millions of computers, from personal computers (PCs) to high performance super computers are connected to the Internet. It is estimated that over 700 million of the 1 billion computers worldwide are connected to the Internet.

Many individuals, businesses, organizations and governments utilize the Internet to exchange such information either internally or with other parties. Despite the vast exchange of information capable of occurring on the Internet, there is a problem with "content islands"—documents and media files that cannot be easily exchanged. The U.S. government's 9/11 Report identifies the problem as catastrophic and threatening national security. Fortunately the technologies of interchange standards like Extensible Markup Language (XML) provide important pieces for solving much of the problem. Unfortunately markup technologies alone cannot solve the problem. Scalable solutions for the large organization and workplace require diligent and aggressive attention to workflow and work cultures. Major content exchange initiatives—for the intelligence community, among military components, and between agencies of the U.S. government—invariably seek to apply XML technologies in an effective manner. The problem is that applying the technologies means to introduce them into everyday workflow and business practice. Emerging exchange technologies of themselves cannot simply modify best practices. The technologies are in fact generating wholly new protocols and practices.

Even if the information can be exchanged, certain information is not intended to be disclosed to everyone. Certain access policies and controls must be implemented to ensure the security of sensitive or private information. The notion of an access policy is simple. Is a given individual, group or computer allowed to access a particular resource or piece of information, or not? In actual practice an access policy for server-based content must account for many aspects of the individual—identification, title, security clearance, role within the organization, need to know, and perhaps current location and type of computer (e.g. hand-held, laptop, mobile).

In addition, a sophisticated policy may spell out security details of the content: its overall level of sensitivity or confidentiality, specific segments that are more sensitive than others, segments requiring specific consent by the owner (a patient record, for example), plus other security-related characteristics. An access policy must therefore be smart, far more refined than simple username-password approaches. A Windows (or Unix) approach of restricting entire files and folders is entirely too blunt to be practical.

In order to provide consistent, universal access policies for the Internet or other wide area networks, a consortium of vendors formulated the Extensible Access Control Language (XACML) standard. XACML can be utilized on practically any network server. XACML allows certain policy authors to have control over who can read, write, or modify components of their records. It is noted that XACML is now a required information access standard across the entire U.S. Department of Defense. The XACML standard is mature and is becoming ever more pervasive.

The downside of XACML—even though it is plain-text XML—is that it still requires programmers to create and modify it. XACML is verbose, highly dependent upon proper syntax, and difficult even for skilled humans to read. Complex syntax or formatting is not a problem for a computer, but remains a major barrier to humans and thus limits a stronger adoption. The result is that a XACML-aware information system requires skilled programming throughout its life cycle.

Given the above, it is currently challenging, if not impossible, to define, manage and deploy policies for secure information access in an agile and consistent manner. Moreover, there is no robust rules-based method for cross-domain message filtering (higher-security to lower-security transfers). Without the ability to enact and deploy XML-based security policy (rule sets or XACML code) quickly, easily, and with a minimum of humanly written computer program code, security authors and administrators cannot hope to achieve the secure exchange of information across the Internet or other networks. In that regard, it would be highly advantageous to eliminate the technical programmer—who does not contribute to the substantive security decisions—which would be a significant breakthrough in the access control area.

Thus, what is needed is a new approach for development of information exchange, access policies and access control. Preferably, such an approach would achieve this by allowing the user to formulate access policy as near natural language without any knowledge of XACML. Once the access policy is formulated, the new approach would also preferably automatically check and convert the near natural language to XACML, with full auditing features and reverse de-compiling to ensure that the XACML created can be converted back to the exact near natural language originally used to create the XACML policy. The present invention, therefore, endeavors to fulfill one or more of the needs addressed above, as will be understood from the following description and accompanying drawings.

SUMMARY

Aspects of the present invention are directed toward a method such that a non-programmer (as a security policy author, certifier, reviewer, or security administrator) can efficiently create, modify, store, and retrieve a XACML access policy.

In one aspect, embodiments of the invention allow the non-programmer-level policy author to create XACML automatically, using the familiar IF . . . THEN . . . ELSE paradigm that is common to both computer programs and business rules. Similarly, embodiments of the present invention provide automatic translation of plain English conditional (IF . . . THEN . . . ELSE) statements to XACML.

In another aspect, embodiments of the invention provide a visible, accessible, seamless, and certifiable audit trail of the compiler's entire translation process. The purpose is to provide certification that the compiler-generated XACML expresses the policy that the author intended to write. More particularly, this certification should confirm that the XACML computer code represents precisely what the author intended, that code certified is unambiguous, invariable, and accurate.

Such certification can be provided by de-compilation or reverse compilation, that is, taking an independent copy of the XACML access policy previously generated and automatically generating the equivalent access policy in near natural language English by utilizing a XACML de-compiler or reverse compiler. Further providing validation, embodiments can also preferably employ intermediate representations of the XACML access policy during the input, compilation and audit stages.

Thus, embodiments of the present invention provide for creation, modification, verification and execution of XACML policies that can be instantly deployed without the requirement of technical programming persons or an intermediary party. Preferably, the user interface is easily configurable—without the necessity of programming skills—to the knowledge framework of users within any community of interest.

When such XACML access policies are implemented, preferred embodiments also exploit the XML technology Extensible Stylesheet Language Transformations (XSLT) for part of the information ingestion, translation and delivery processes. Medium and apparatus claims for the above method are further disclosed.

System embodiments of the present invention are also disclosed, typically comprising: (i) a graphic user interface for the inputting of one or more security-related parameters in near natural language expressions, (ii) a compiler to interpret the near natural language expressions, create intermediate data structures and create XACML code, and (iii) a de-compiler to parse XACML code and create a near natural language representation for comparison to the one or more security-related parameters.

BRIEF DESCRIPTION OF THE DRAWINGS

Embodiments of the invention are illustrated by way of example, and not by way of limitation, in the figures of the accompanying drawings and in which like reference numerals refer to similar elements.

FIG. 16 is an illustration of a sample portion of a near natural language representation according to an embodiment of the invention.

FIG. 17 is an illustration of a sample portion of a tokenized language representation according to an embodiment of the invention.

FIG. 18 is an illustration of a sample portion of data structures according to an embodiment of the invention.

FIG. 19 is an illustration of a sample portion of XACML code according to an embodiment of the invention.

FIG. 20 is a diagram illustrating the process of compiling and de-compiling XACML code according to an embodiment of the invention.

FIG. 21 is a block diagram of a prior art computer and Internet connection upon which embodiments of the invention can be implemented.

DETAILED DESCRIPTION OF PREFERRED EMBODIMENTS

In the following description, for the purposes of explanation, specific details are set forth in order to provide a thorough understanding of the invention. However, it will be apparent that the invention can be practiced without these specific details. In other instances, well-known structures and devices are depicted in block diagram form in order to avoid unnecessary detail of the invention relating to the corresponding discussion; and similarly, steps in the disclosed method are depicted in flow diagram form. Section titles and references appearing within the following paragraphs are intended for the convenience of the reader and should not be interpreted to restrict the scope of the information presented at any given location.

Various aspects and features of example embodiments of the invention are described in more detail hereinafter in the following sections: Functional Overview, XACML Language, XACML Compiler, Natural Language Editor, Reverse Compiler, Computer Implementation and Conclusion.

Functional Overview

In the prior art, security policies are to define, manage and deploy items of information on computer infrastructures. However, these security policies are themselves typically difficult to manage in an agile and consistent manner. Moreover, there is no robust rule based implementation for cross-server or cross-domain message filtering (higher-security-level to lower security-level transfers).

Typically, an access "policy set" is comprised of one or more "policies." Each of the policies is comprised of one or more "rules", with each of the rules comprised of one or more "conditions" to determine whether a given rule is met. Thus, a policy set, policies, rules and conditions represent the conventional hierarchy of a typical access system. A policy set, policy, rule or condition can be expressed in a written language (e.g. English) or a computer language (e.g. XACML), but typically these terms are used in both expressions. Moreover, the term "real-world" is recited within the present disclosure to designate the logic and details of an access policy that exists in the real world (e.g. a verbal expression of an access policy, a written expression of an access policy whether in shorthand or longhand, etc.). For example, if a policy maker articulates an access policy to another in spoken English, or in some form of written English, this would be considered a real-world access policy.

Without the ability to enact and deploy XML-based security policy sets quickly, easily, and with a minimum amount of human interface, security authors and administrators cannot hope to achieve the various advanced technology goals for XML tagged and signed information currently endeavored by governments and the business world. Embodiments of the present invention seek to remedy such shortcomings, providing a user-friendly interface with powerful verification processes.

Figure 1:
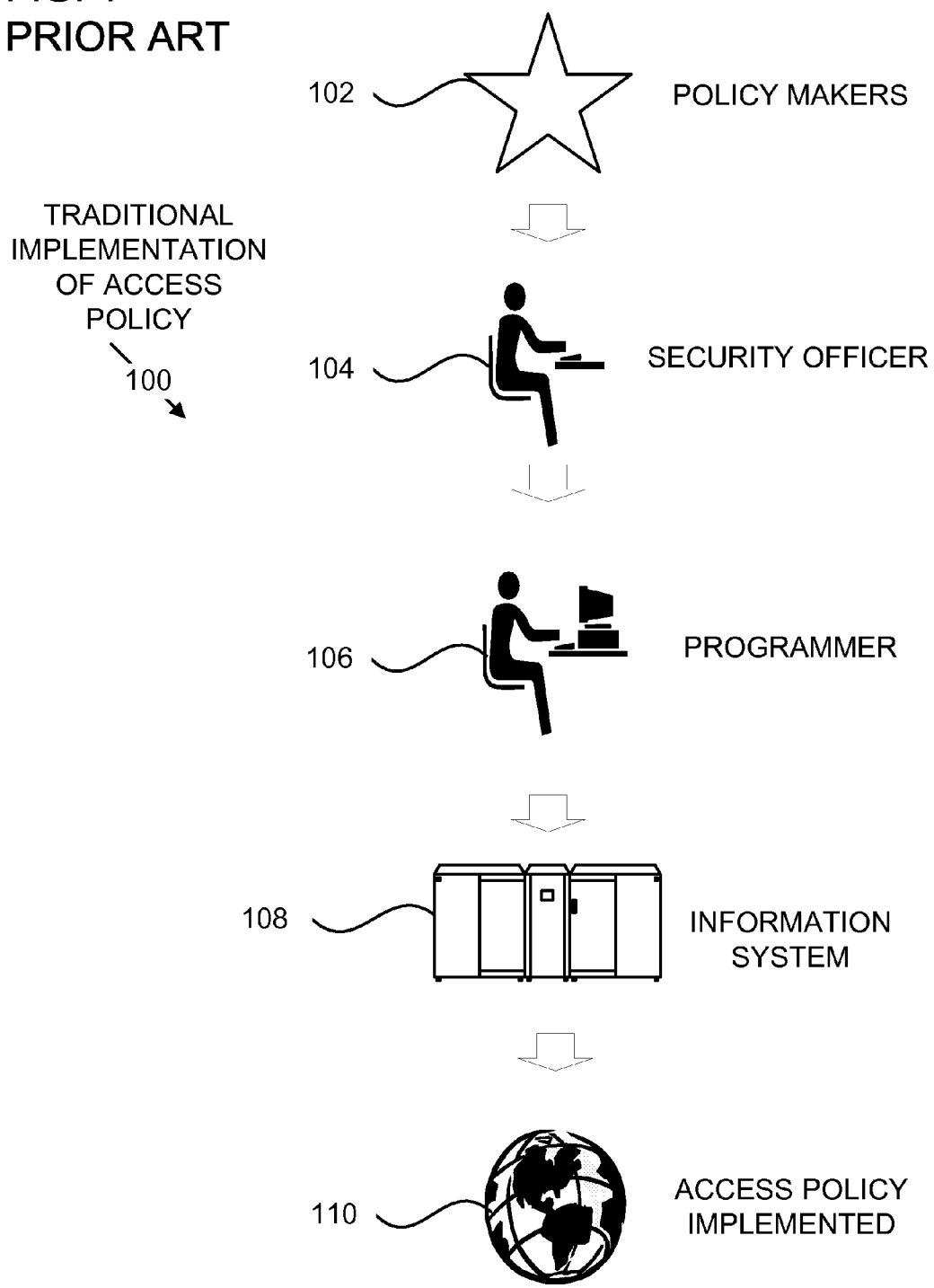
FIG. 1 is a diagram illustrating a prior art approach to implementation of an access policy.

Turning to FIG. 1, a diagram 100 of traditional implementation of access policy is shown, namely depicting the typical parties and components of a prior art security policy infrastructure. More particularly, one or more policy makers 102 typically provide security-related parameters to a policy author 104 (e.g. a security officer) for implementation. The policy author 104 then effects such a policy by and through a policy programmer 106 (e.g. a computer programmer) who creates the specific and complicated XACML code to place into the security information system 108. Once introduced into the information system 108, an access policy is implemented throughout the organization's environment 110. Thus, the mutual efforts of multiple persons (policy author 104 and programmer 106) in-the-loop are required to effect a given set of one or more security-related parameters. The combination of a plurality of persons and the combination of technical and non-technical persons introduces a higher level of vulnerability and increases the complexity of deploying a given set of one or more security-related parameters.

Figure 2:
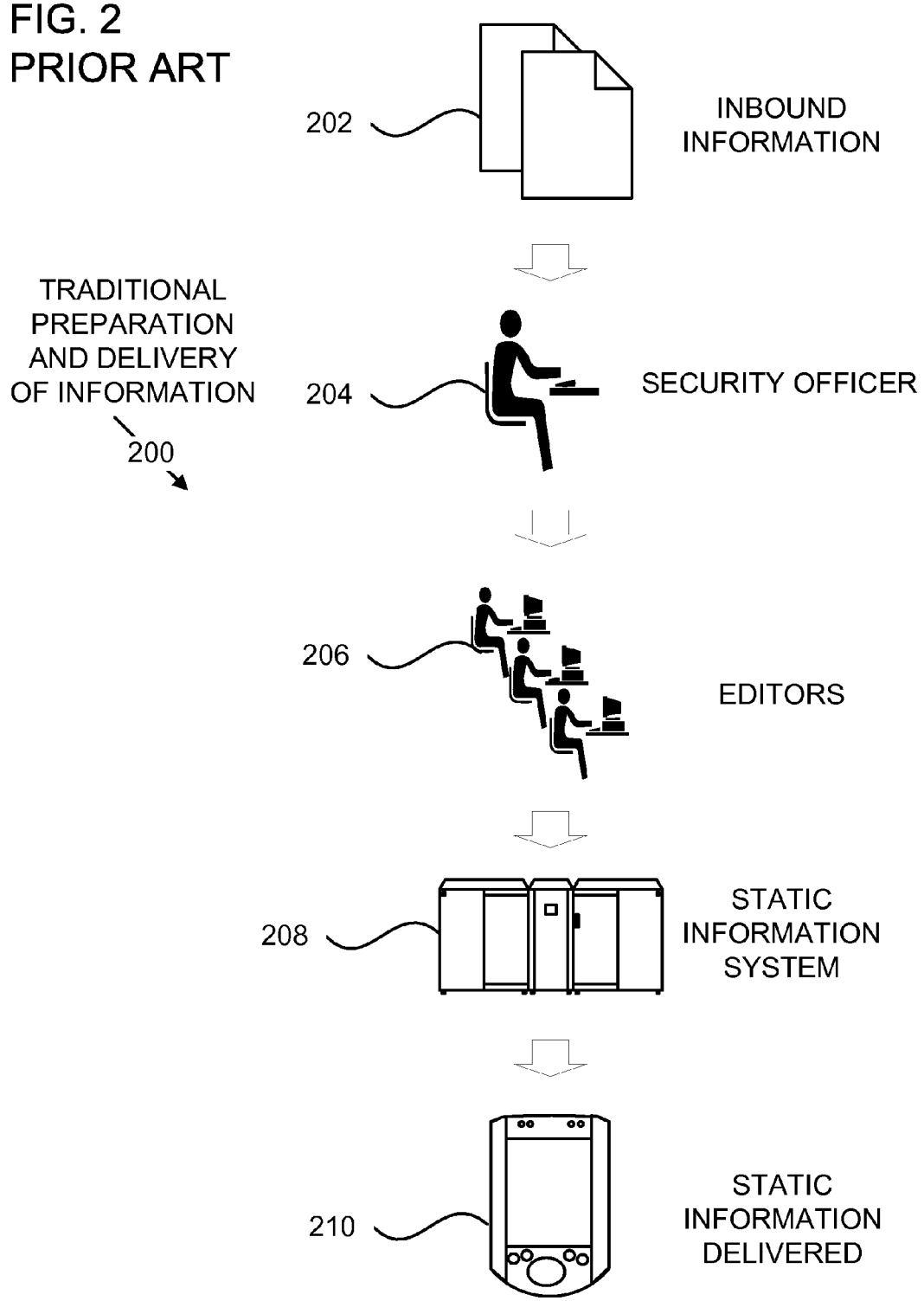
FIG. 2 is a diagram illustrating a prior art approach to preparation and delivery of information pursuant to an access policy.

In FIG. 2, a diagram 200 illustrates the prior art preparation and delivery of information given a typical large organization or government. An inbound information (e.g. communication, document, map, etc.) 202 is reviewed by a security officer 204 for filtering, redaction, restriction or other sanitation procedures. In conjunction with one or more editors 206, the inbound information 202 is edited for various security levels and stored statically on an information system 208. Upon request by a requesting party 210, provided the access policies are met, the information in its previously edited form (corresponding to the appropriate level of security) is delivered to the requesting party 210.

Embodiments of the present invention seek a process of policy authoring and information ingestion/delivery that is more efficient, reliable and rapid than the processes described above. In particular, embodiments of the present invention provide graphic user interfaces that allow policy authors to develop and manage both access policies and transformation rules (especially for down-transfer) quickly and without the need for programming skills.

Figure 3:
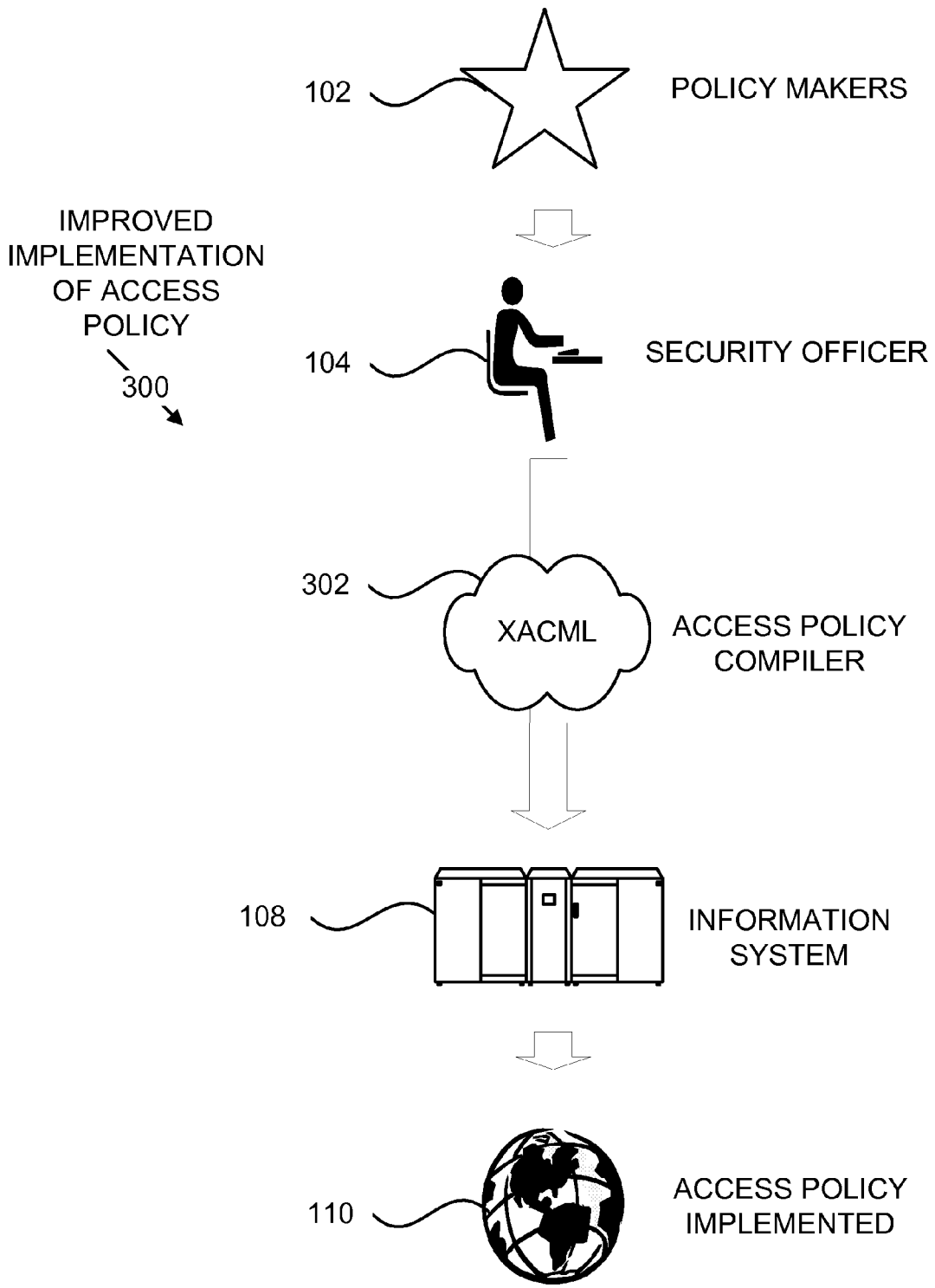
FIG. 3 is a diagram illustrating an improved approach to implementation of an access policy according to an embodiment of the invention.

Turning to FIG. 3, a diagram 300 is shown similar to prior art diagram 100, containing policy makers 102, policy author 104, information system 108 and access policy environment 110. However, it is noted that an access policy compiler 302 replaces the programmer 106, thus increasing the reliability and reducing the complexity of the deployment of one or more security-related parameters. Such an access policy compiler 302 will be discussed in a section below in the disclosure.

Figure 4:
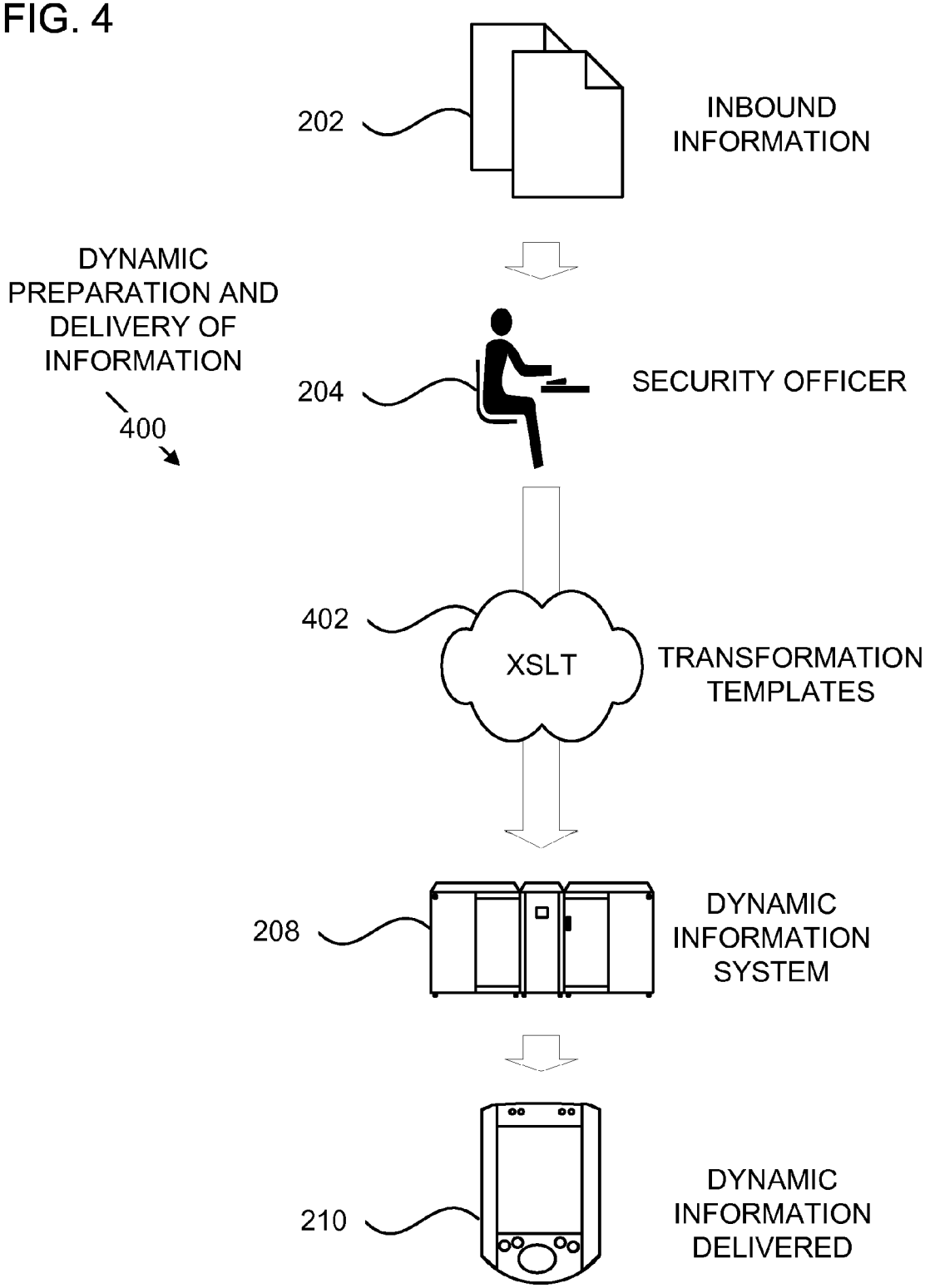
FIG. 4 is a diagram illustrating an improved approach to preparation and delivery of information pursuant to an access policy according to an embodiment of the invention.

Likewise, turning to FIG. 4, a diagram 400 is shown similar to prior art diagram 200, containing inbound information 202, security officer 204, information system 208 and requesting party 210. However, rather than having one or more editors 206 to edit the information and store a static copy, one or more transformation templates 402 are used to create a properly sanitized copy of the information that is dynamically stored on the information system 208. The "dynamic" nature of the document is such that if rules or parameters change, the changes take effect without the need for re-editing by one or more editors 206. Embodiments of the present invention seek to deploy a security policy having programmer-free policy management and unmediated (no "person-in-the-loop") policy deployment.

Once the above described policies and transformations are safely in place, embodiments of the present invention execute reliable high-to-low cross-domain transfers without the need for further human intervention or editing. In an exemplary embodiment of the present invention, the access policies are stored as Extensible Access Control Markup Language (XACML) and the transformation rules are stored as Extensible Style Sheet Transformations (XSLT). While XSLT serves as an exemplary language for transformation rules, other transformation languages can be used with equal success depending upon the specific application or community of interest desired.

Beyond the mere deployment of policies and editing of information, prior art in the industry exhibits security products typically having a simplistic "security-high" approach for releasing information. That is, the entire document or other media is flagged with a particular protection level, allowing its release only to viewers with that security clearance and above.

Preferred embodiments of the present invention are typically more sophisticated and granular in nature. Preferred embodiments of the present invention apply XACML policies—not brute-force programming or simple database matching—to the entire access process. First, the profile of the target user (e.g. requester, subscriber) is determined in order to decide on his/her access to the system. After a user is granted access, he/she can request specific information. The access system's policy engine now matches access policies attached (i) to the user and (ii) to the content in order to determine precisely what the user can and cannot access. Yet another set of rules transforms the content to match the user's access level.

Moreover, traditional approaches to access have concentrated on actual assets, metadata and databases. Typically, the security manager of content adds appropriate security level markup (e.g. tagging, redaction, deletion) to the actual content and metadata. On the other hand, preferred embodiments of the present invention maintain a hands-off approach to the content. Instead of adding more and more tagging to the content, the security manager drafts policies that apply to the tagged elements in their present state. As such, it is preferable over the prior art as a security officer or information administrator need only review or tag the content once.

By way of example, in the current embodiment a security officer can review and "tag" (e.g. mark up with XML tags) a document sufficiently to enable filtering at any level. Once the document is fully tagged, no further review or tagging would need to be done because the security policies downstream are developed to take advantage of the existing tags. Thus, if the security level of the given document is changed, this becomes a change or task for the development of the policy rules or conditions, rather than the document. Since the document's tags do not need modification, the approach of the present invention averts the need for subsequent re-tagging of the document.

To the contrary, in the prior art the change of security policy requires reprogramming of content. This approach, which requires editing of the content, will not support situational awareness and other time-critical applications. However, in preferred embodiments of the present invention, a security officer can edit a policy and that policy to be propagated immediately to the entire system (e.g. a universe of previously tagged documents) in real-time.

Most informed information specialists recognize that such preferred methods of policy propagation using XML involves the insertion of tags into content. Governments and businesses have invested monumental efforts in tagging documents and creating tagged metadata to make them Internet and XML friendly. In this regard, preferred embodiments of the present invention further capitalize on utilizing XSLT, a programming language whose purpose is to change one XML file to a different XML file. Such transformations are helpful for real-time delivery of documents under a deployed XACML access policy.

Preferred embodiments of the present invention further seek to utilize a near natural language interface, such that the policy author can select pre-defined selections, serving as building blocks, which formulate a plain-English version of a complex security rule. Preferably, there is no free-composition typing required, although such free text editing can be applied in certain embodiments if desired.

Thus, embodiments of the present invention preferably place content sanitization (filtering) in control of a policy author (e.g. a security officer). Just as the author drafts access control policies in XACML using the near natural language provided by embodiments of the present invention, he/she preferably also describes the various transformations required for information to move from higher to lower security levels within an organization and among different organizations. Preferably, embodiments of the present invention offer four categories of transformations: phrase-based, element-based, metadata-based and attribute-based.

First, for phrase-based textual content, a transformation can either substitute for a word or phase or delete it altogether. The system detects word stems (like "captur-") so as to recognize "capture," "captured," and "capturing." Thesaurus-based substitution (under the author's control) allows for substitution of "safer" terms: "detain" or "arrest," instead of "capture," for example. For deletion rules, the author can specify deletion units: whether the transformation should delete a word, a phrase, a sentence, a paragraph, or some larger unit.

Second, if the policy author is familiar with the tag set (element names) of the content he/she may write deletion transformation rules based on actual XML elements. For example, only top secret cleared users may view the current geographical coordinates of ships in a fleet.

Third, non-textual data (satellite images, for example) typically can require down-sizing or cropping for delivery to a mobile computer. Information image resolution, coordinates, colorization, and display size are typically stored as metadata. A transform rule can specify local coordinates, a smaller size, and reduced resolution for delivery of the satellite image to a cockpit or dash-mounted computer.

The discussion will now turn to more detailed aspects of the XACML language, followed by approaches for a XACML compiler as disclosed in the present disclosure.

XACML Language

The Organization for the Advancement of Structured Information Standards (OASIS) standard Extensible Access Control Markup Language (XACML) allows for an open standards, portable method for expressing access policies to computer systems and stored content. As defined by the XACML standards glossary a XACML "policy" is a set of XACML rules, which can be also referred to as XACML code. As a ratified standard XACML is the preferred open-systems approach for negotiating access to sensitive and secure content. It is considered a rich XML language because it allows security policy authors to express complex access policies for an infinite number of situations. But there is a cost for this degree of flexibility in XACML.

The language, although it is plain-text XML, is difficult for a non-expert to read closely, and it is cumbersome if not nearly impossible for a non-programmer to create manually on a regular basis. From the time of its original ratification as a standard, experts predicted that XACML code could only be written with the aid of tools, not hand-composed from scratch. However, such tools have not become friendly enough for a non-programmer to create XACML code using such tools.

Because XACML is an XML language, it is possible to author and to validate XACML with a general-purpose XML authoring product. However, that does not resolve the problem of XACML's inherent complexity, and it does not reduce the need for a XACML-specific authoring tool. Preferably, embodiments of this invention accept input from a user-friendly graphic user interface (GUI) and compile that user input to proper XACML policies. In doing so, the user expressing the access policies does not necessarily need to possess programming skills in XML, XSLT or XACML.

XACML is an important player among the server's security resources (its "security stack"), relieving the security officer from constant, close maintenance of actual content. XACML is maturing by virtue of its adoption by major user communities (e.g. U.S. Department of Defense), but the larger issue is whether security policies can be scaled effectively to large organizations, large volumes of complex content, and across heterogeneous information cultures. Security policies, like the content they protect and like the software that supports them, are "living documents," undergoing constant change. Content, like software, has a life cycle. Even a single unit of content—a recorded album on a CD, for example—may represent a complex multi-layered security and access policy: credits, residual intellectual property rights for each contributor, contract terms unique to each subcontractor.

With a XACML authoring tool the policy author must now rely on the tool to express precisely the original semantic intent of his or her policy. Such authoring tools, therefore, present the possibility for a covert intrusion in the compilation process to create XACML that does not represent the author's original intent. The true effectiveness of a trusted XACML authoring facility therefore requires a means for certifying that the compiled code (XACML) does in fact represent the author's intent. Generating this audit trail must be an easy-to-operate feature of the system. In certain embodiments, if desirable, intermediate forms of the data or the XACML policy can be made available for viewing to a policy auditor or a XACML-literate examiner.

It is further possible for assuring the integrity of the policy author's intention that the system's data flow be commutative. That is, it should be able to accept the XACML access policy it generated and reproduce reliably the plain-English version of the access policy. Exercising this function of the compiler in a trusted clean room, free of any possible covert activity in the data flow, is a reliable means of assuring that the integrity of the author's intention was preserved in the generated XACML access policy.

As such, a "reverse compiler," or de-compiler function of the system, plays a primary role in certifying the compiler for entire classes of XACML rules and can significantly increase the reliability and efficiency of a XACML certification process. In a typical prior art certification process, a policy maker (e.g. superior officer, certification laboratory, executive board, etc.) first hand-writes a plain-English access policy, which is then handed off to a second (technical) person for conversion into its XACML equivalent. A third (technical) person will thereafter take the XACML equivalent generated by the second person and independently convert the XACML back into a second plain-English access policy. If the original plain-English policy (created by the policy maker) is identical to the second plain English policy (independently created by the third person), then this set of trusted plain-English policies and the corresponding XACML access policy comprise a trusted and certifiable policy as expressed both in plain English and XACML formats. As noted, the prior art process can be time consuming and requires three persons, (including at least two technical persons). However, if utilizing a trusted XACML compiler and de-compiler, both a XACML access policy and an independently generated plain-English policy can be created in a single automated process that does not require the participation of two technical persons. This "round trip" (e.g. compilation and de-compilation) will certify the compiler's freedom from covert activity and error, while increasing both reliability and efficiency of the XACML generation and certification process Preferably, the source XACML code that is provided to such a reverse compiler originates from a trusted source (e.g. a network location having a certificate to certify its identity) or a trusted document (e.g. a document having a digital signature to certify its authenticity via certificate). Such measures can reduce the inherent vulnerability that the XACML code provided to be reverse compiled was supplied from a source that is not the same code that was previously generated by the XACML compiler.

A further preference for a practical XACML authoring environment is that the interface must intelligently constrain the policy author. That is, it must present the author with options that match the profile of the particular business or institution or content store. This means that the internal data structures of the implementation and the setup procedure for the implementation must allow for easy initial and ongoing customization.

Large organizations, particularly in the U.S. government, require large teams of policy officers who will most likely work at multiple locations. It is unrealistic to assume that a policy will be owned and maintained by a single author. Instead it is inevitable that multiple authors will participate throughout the policy's life cycle. Moreover the policy itself (or segments of it) may either merge with other policies or split to become separate new policies.

For the exchange of access policies across security domains or across organizational boundaries the management issues can become even more complex. Security officers from multiple agencies or departments may likely need to negotiate and reconcile competing policies in order to exchange their assets in an agreeable manner. Fortunately they can all safely work with the same security mechanism (XACML). But the mechanism itself does not solve the management problem. The management problems associated with a policy's life cycle are therefore of two varieties: a lack of appropriate tools and a need for an appropriate work flow. Because a XACML policy is a document—not an instance of a specialized security programming language—the task of a XACML-based policy management system is to manage XACML documents.

Finally, it is highly preferable that a XACML authoring system be portable. It should operate on virtually any computer and not rely on platform-specific or operating system-specific mechanisms for translating the author's source language into XACML.

XACML Compiler

Figure 5:
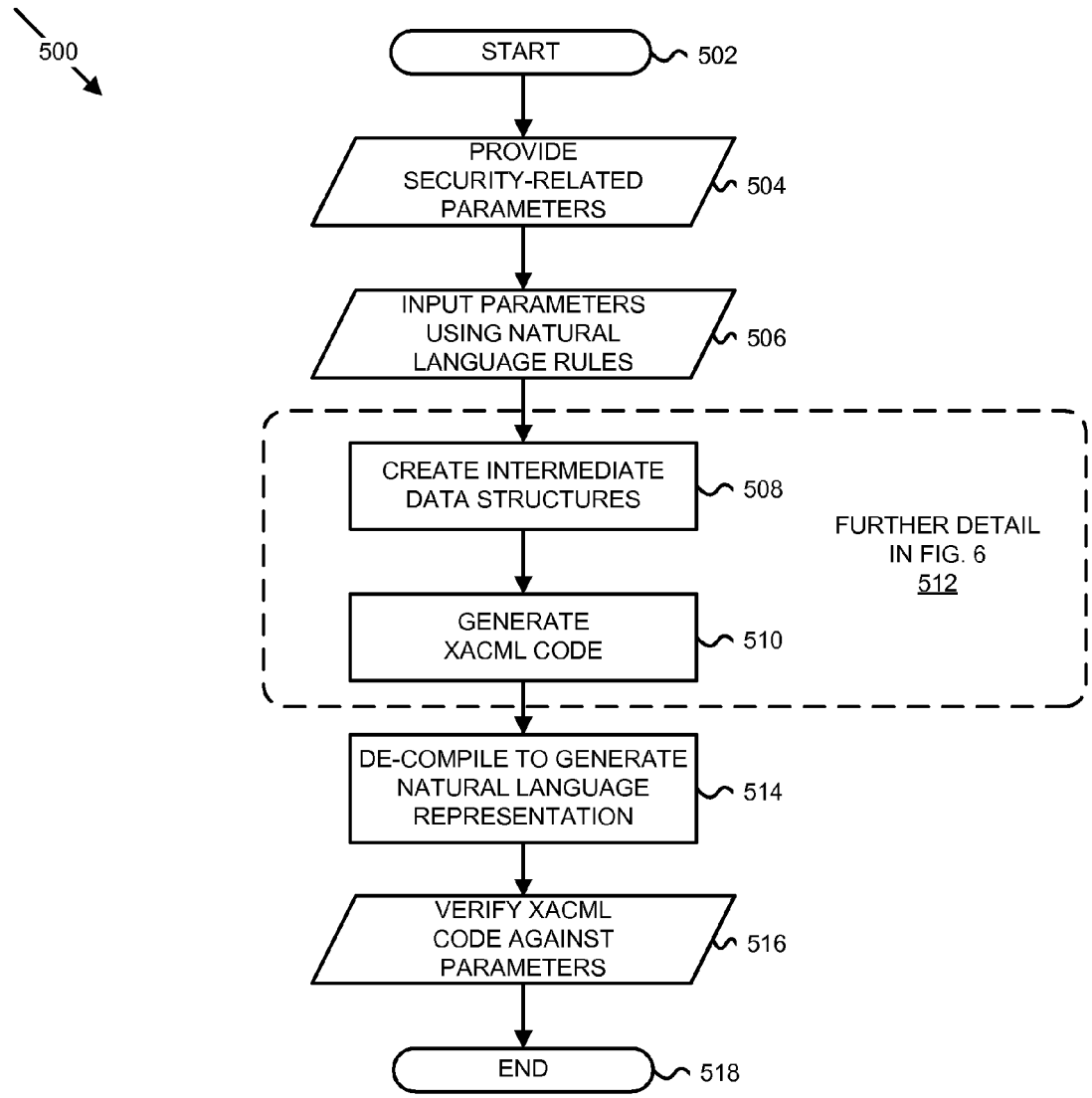
FIG. 5 is a flow diagram depicting a method for generating and verifying XACML code according to an embodiment of the invention.

Turning to FIG. 5, a flow diagram 500 depicts a method for generating and verifying XACML code according to an embodiment of the invention. Proceeding from the start at step 502, one or more security-related parameters are provided in step 504. Such one or more security-related parameters of a real-world access policy are typically native (e.g. English) language parameters which control the access to documents based on a variety of different conditions.

In step 506, the one or more security-related parameters are input using near natural language rules; that is, preferably the parameters are either selected from near natural language pre-defined selections or typed using free text typing. FIGS. 7 through 10 will articulate further detail on the near natural language interface in preferred embodiments.

Figure 6:
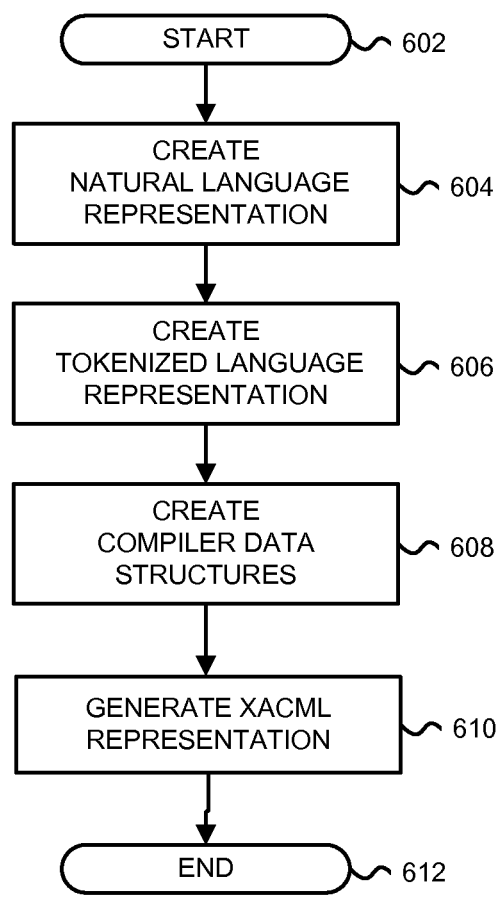
FIG. 6 is a flow diagram depicting a method for creating intermediate data structures and generating XACML code according to an embodiment of the invention.

Once the one or more security-related parameters are input into the near natural language interface, a XACML compiler preferably creates one or more intermediate data structures in step 508 for imminent use in the subsequent step of generating the XACML code in step 510. As indicated by the region 512, further detail of the compiler and generation of XACML code is provided in the discussion of FIG. 6, later in this section. As noted above, XACML code is generated in step 510, which can, if desired, be immediately deployed and implemented in the organization's environment.

In preferred embodiments of the present invention, it is desirable to have a procedure to certify the proper syntax of the newly generated XACML code.

Further, it is also preferable to have a procedure to certify the intention of the newly generated XACML code. This can be accomplished by taking the newly generated XACML code and reverse compiling the code to generate a near natural language representation, as depicted in step 514. The generation of this near natural language representation is preferably accomplished with data structures that are independent of the data structures utilized in step 508, to render an independent result from the steps taken in step 508 and step 510.

Once the reverse compiled near natural language representation is generated in step 514, the reverse compiled near natural language representation is compared to the one or more security-related parameters provided in step 504—to verify intent and accuracy. Upon such comparison or verification being complete in step 516, the process ends in step 518 as depicted.

As noted earlier, FIG. 6 is a flow diagram 600 further detailing the steps 508 and 510 of diagram 500, namely the creation of intermediate data structures and generation of XACML code. The process starts at step 602, (which assumes that one or more security-related parameters have already been provided in light of earlier steps performed in diagram 500).

In some embodiments, it can be preferable to display a near real-time near natural language rendition of the access policy while it is being input into the near natural language interface. In such case, the rule fragments, being input from user as parameter options, are transformed into a data stream of near natural language representation by the XACML compiler in step 604. As sample of a near natural language representation is depicted in an illustration 1600 of FIG. 16.

Returning to FIG. 6, in step 606 the XACML compiler can optionally create a tokenized language representation of the access policy being developed from the one or more security-related parameters being input by the user. A sample of the tokenized language representation is illustrated in an illustration 1700 of FIG. 17. At a basic level, the XACML compiler creates the tokenized language representation by pre-pending (flagging) each of the collected and pre-stored rule fragments of the near natural language representation. Such a tokenized language representation is typically not displayed nor visible to a user but if configured as such, can be useful for observing the internal processes of the XACML compiler.

In step 608 of flow diagram 600, preferably additional intermediate data structures are created by the XACML compiler for downstream operations and creation of the XACML code. More particularly, the XACML compiler can create a symbol table an assertion table, a parse tree and an action table, as further detailed on FIG. 18 in illustration 1800, where a symbol table 1802, an assertion table 1804, a parse tree 1806 and an action table 1808 are illustrated. Note that a symbol table 1802 and parse tree 1806 are typically created for the process of creating XACML code, although each of these intermediate data structures are not necessarily essential to the creation of XACML code. Optionally, an assertion table 1804 and action table 1808 can be utilized in applications where desirable, though these data structures are not typically required for the creation of XACML code in downstream steps.

With respect to the symbol table 1802, the XACML compiler preferably stores each of the rule fragments as symbols in the symbol table 1802. Second, the XACML compiler can optionally convert each logical assertion (e.g. INCLUDES, VALID, and NOT EXCEEDS) to a string that is suitable for storage in the assertion table 1804. Next, the XACML compiler can optionally store the actions (the result of successful/failure of access credentials) in the action table 1808. Finally, the XACML compiler can optionally create a symbolic tree of the policy, reducing the two-dimensional nested phrases (statement blocks) of the near natural language representation (or tokenized language representation in some embodiments) into a single-line string, expressing the nested relationships of the policy, rule(s) and condition(s). While a symbol tree 1802 and a parse tree 1806 are typically provided in a preferred embodiment of the present invention, the assertion table 1804 and action table 1808 are explained for purposes of sample optional intermediate data structures. Where desirable, it is technically feasible in some applications to have procedures that convert the near natural language selections directly to XACML code without such intermediate representations.

If desirable, the above intermediate data structures or other data structures can be shown to the policy author or user of the XACML compiler in a graphic or textual format, such as a directed acyclic graph (DAG) or as an Extensible Graph Markup and Modeling Language (XGMML) representation.

Finally, the XACML compiler then uses the intermediate data structures to generate the XACML executable code or representation in step 610. A sample of generated (compiled) XACML code is provided in illustration 2000 of FIG. 20. Upon the completion of the generation of the XACML code, the immediate process ends with step 612 in FIG. 6.

Natural Language Editor

Figure 7:
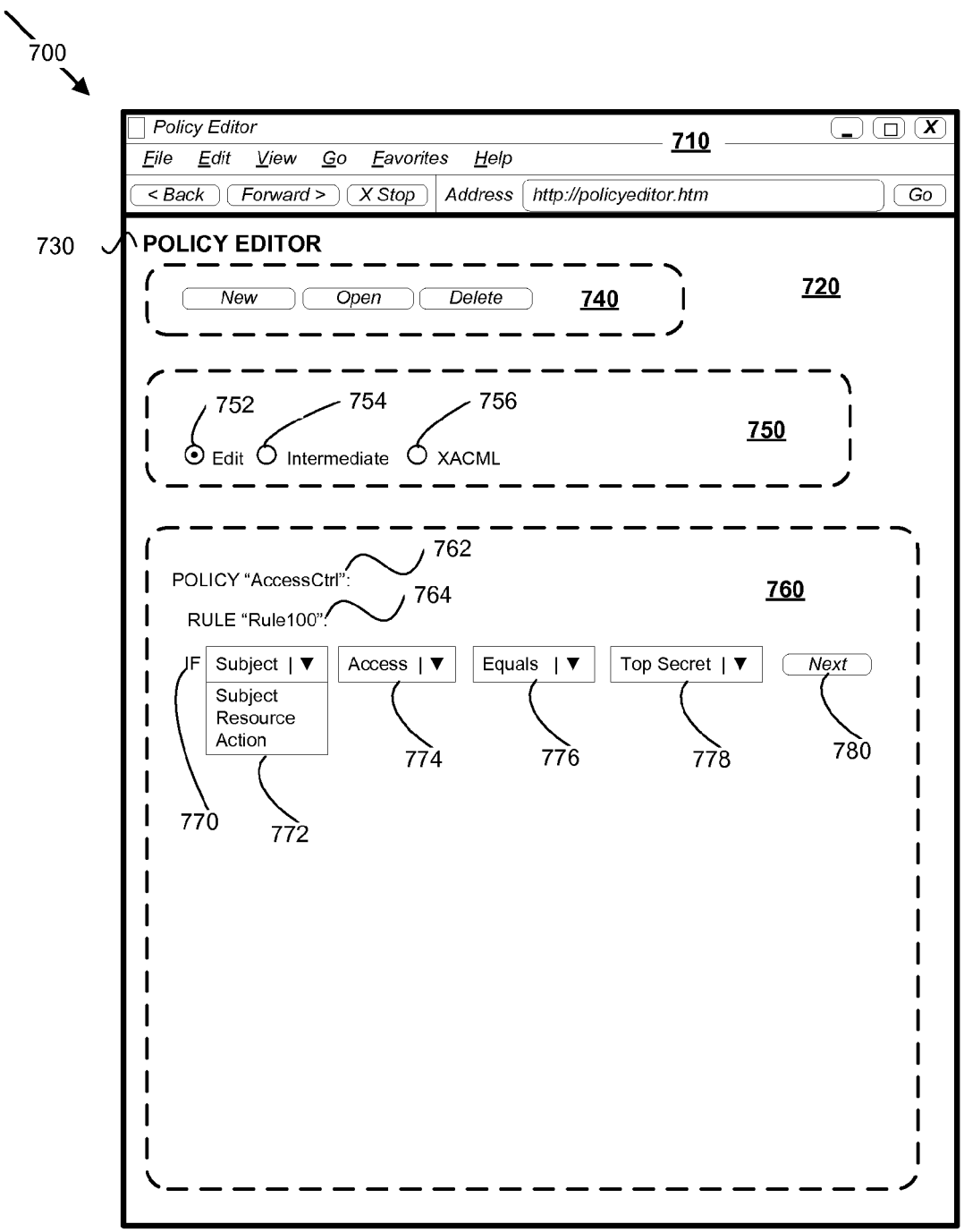
FIG. 7 is an illustration of a graphic user interface providing a policy editor according to an embodiment of the invention.

FIG. 7 is an illustration 700 of a graphic user interface providing a policy authoring feature or policy editor, according to an embodiment of the invention. While such a graphic interface is not restricted to a web-connected computer application, in preferred embodiments the interface executes on a web browser 710 having a browser window 720 capable of secure viewing of HTML, XML or other code (e.g. Adobe Flash). Typically, a page header 730 indicates the function of the present page loaded into the browser window 720.

As shown by region 740, various choices are preferably provided for creating new access policies, opening existing access policies or deleting present policies.

A region 750 illustrates three primary view choices available in the policy editor, namely an edit view button 752, an intermediate view button 754 and a XACML view button 756. As depicted by the filled radio button of the edit view 752 choice, the policy editor is in "edit" mode whereby a policy can be created or edited.

In region 760, a near natural language editor allows a user to create rules for an access policy using pre-determined selections. More particularly, a policy identifier 762 indicates the present policy being edited, and rule identifier 764 indicates the present rule of the present policy being edited (since multiple rules can be created/edited for a given policy).

An "if" identifier 770 introduces various near natural language pre-defined selections 772, 774, 776 and 778 available to the user. As shown, it is preferable to have such selections 772 through 778 in drop-down box format, although free-form text entry can also be used with effective results. When a given rule is completed on the interface, the user (not shown) can click (execute) a next button 780 to proceed to choosing an action for the rule fragment. As illustrated, such an interface is provided in constrained English adhering to a context-free grammar, such as one written in Backus-Naur Form, although other constrained languages or grammars are also possible to configure.

Figure 8:
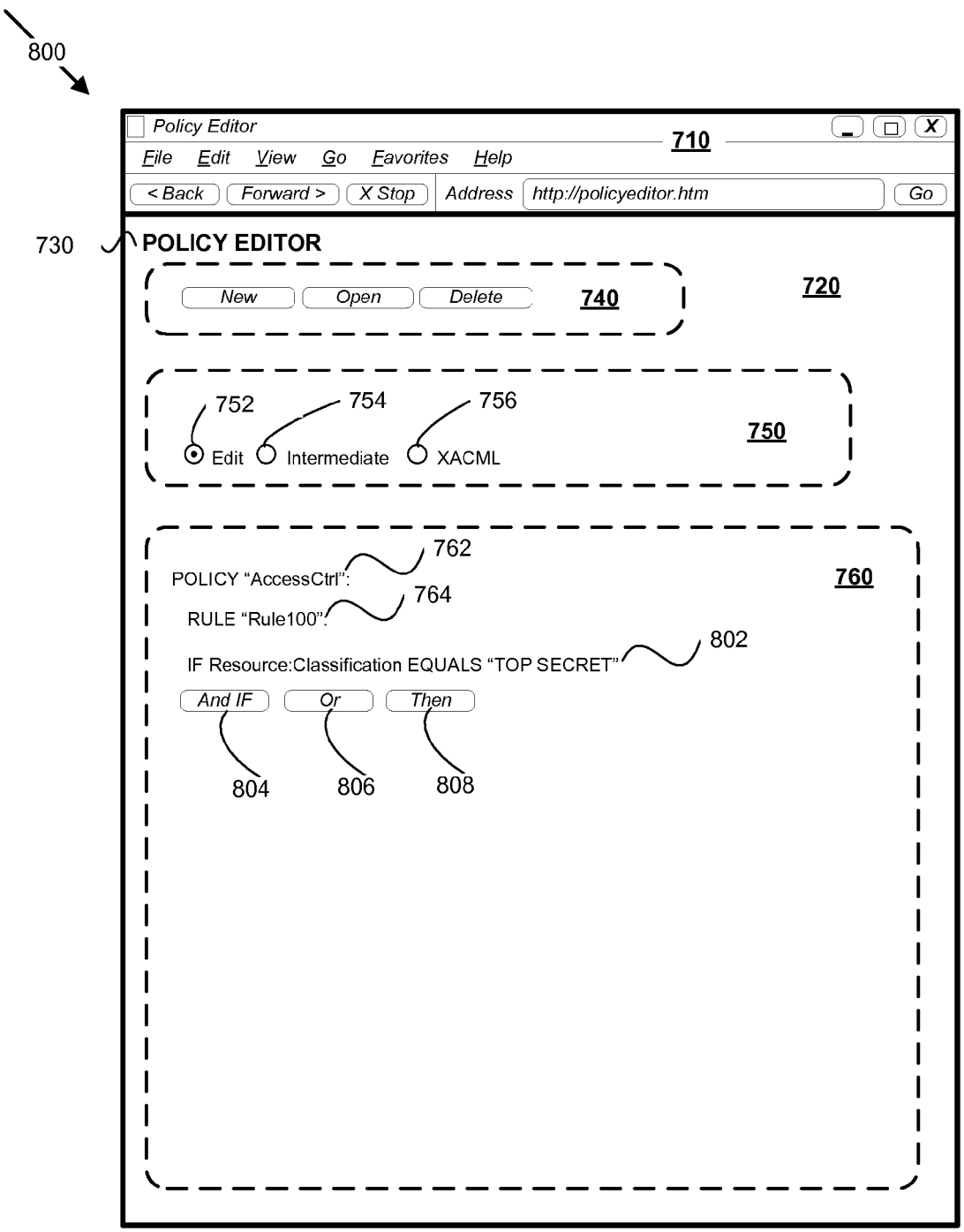
FIG. 8 is an illustration of a graphic user interface providing a policy editor according to an embodiment of the invention.

Following the inputting of the condition or rule fragment, FIG. 8 is an illustration 800 similar to illustration 700, thereby providing the continued input of an access rule. More particularly, within region 760 a rule fragment 802 is visible depicting the rule fragments selected from the prior illustration 700. The primary purpose of the interface in illustration 800 is to determine whether further conditions or rule fragments need to be added to the present policy shown in a policy identifier 762 and a rule identifier 764. As depicted, another rule fragment can be added through clicking (executing) an "and if" button 804 or an "or" button 806, which would provide a continued interface similar to that provided in illustration 700. If all of the conditions or rule fragments are already input, then the "then" button 808 is clicked to conclude the conditions or rule fragments section.

Figure 9:
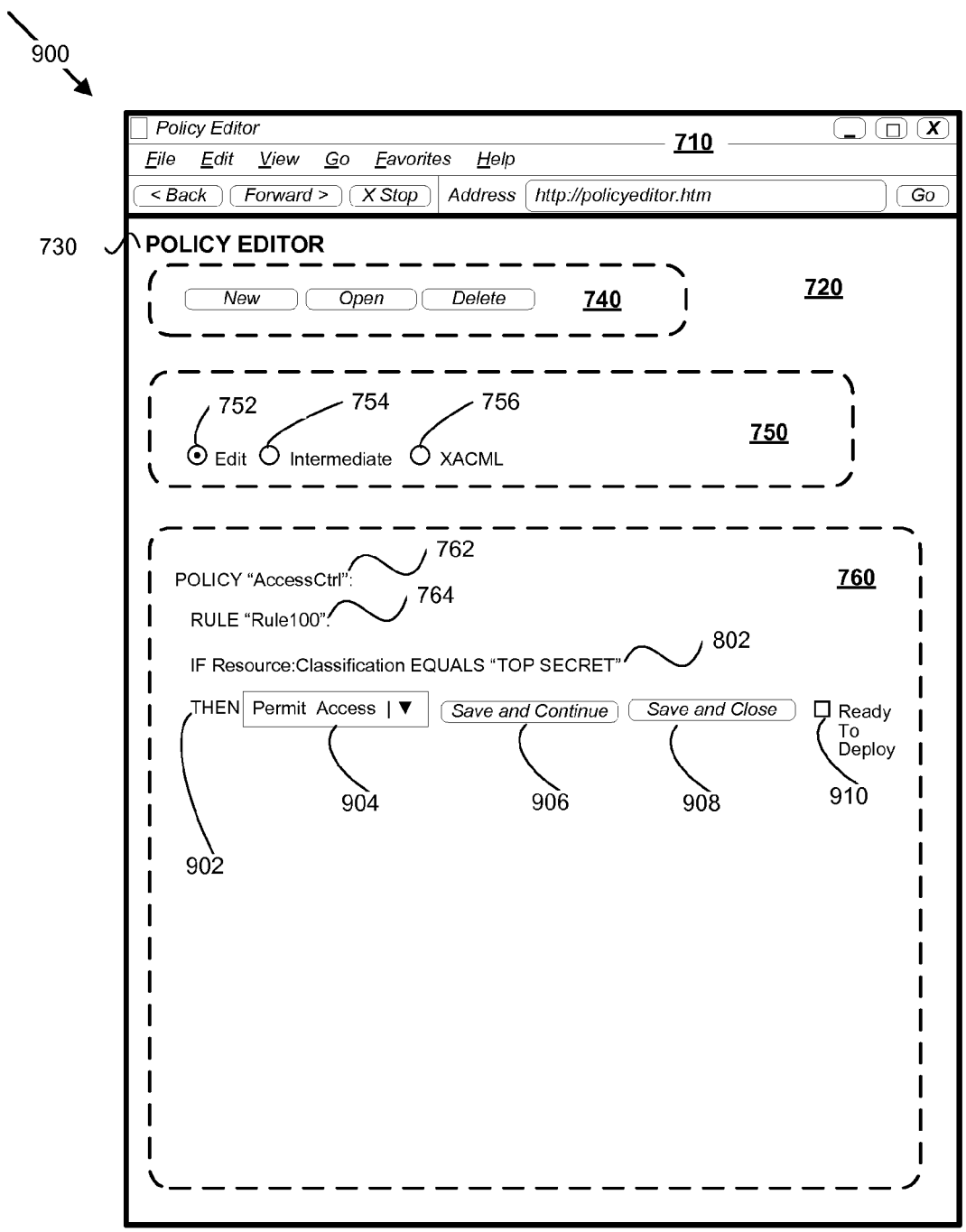
FIG. 9 is an illustration of a graphic user interface providing a policy editor according to an embodiment of the invention.

Turning to FIG. 9, an illustration 900, similar to illustration 800, depicts the next step of the policy editor, namely the selection of an action to be taken based upon the outcome of the conditions or rule fragments. More particularly, a "then" identifier 902 introduces the selections available in an action selector 904. Once the correct action is selected in the action selector 904, the user can either select a "Save and Continue" button 906 or a "Save and Close" button 908, (namely whether the policy is to be continued or simply closed). If the policy is appropriate for deployment, the checkbox 910 labeled "Ready To Deploy" can be selected for immediate deployment.

Figure 10:
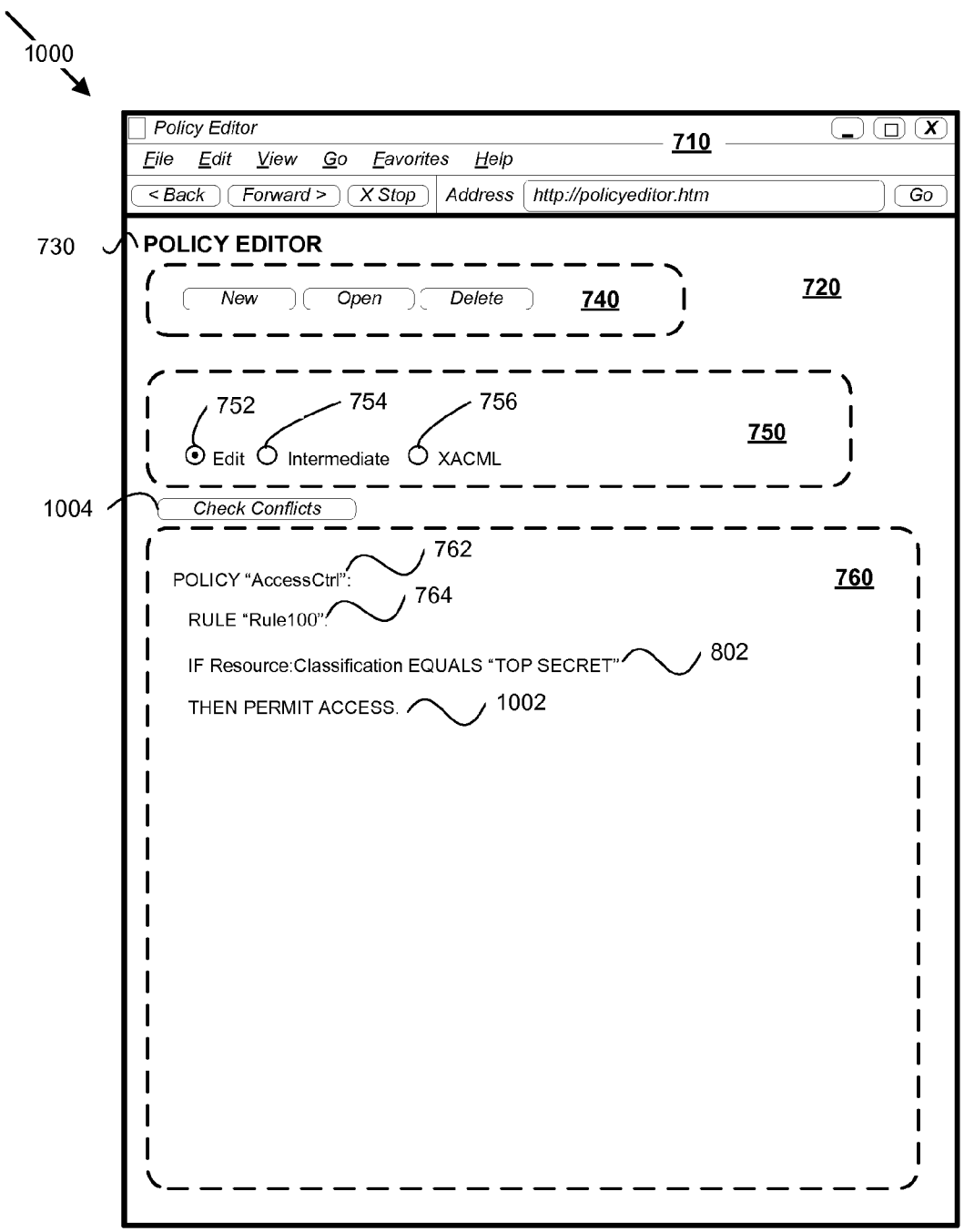
FIG. 10 is an illustration of a graphic user interface providing a policy editor according to an embodiment of the invention.

FIG. 10 is an illustration 1000, similar in most respects to illustration 900, conveys the policy developed by the policy editor during the described process. More particularly, it is noted that the action selected in the action selector 904 of illustration 900 is reflected in an action identifier 1002. This informational screen, if implemented, allows the user to inspect and approve the policy that has most recently been edited, as well as the final result.

When the user has finished constructing an access policy, the user next checks to see whether there any logical inconsistencies or outright conflicts. These are errors, many of which are non-obvious, that could lead to unintended and dangerous consequences once the policy is launched. As such, it is preferable to have logic and other error testing performed on the access policy input by the user. If any errors are found, the screen in FIG. 10, or another dialog or alert at a different juncture, is an appropriate time to alert the user of such an error or conflict.

As illustrated by button 1004, it is also helpful on selected screens to provide a means to manually allow a user to invoke a check to identify human errors or logical errors against the one or more parameters input into the screens, including but not limited to tautology, conflict or redundancy errors. By way of example, upon clicking the button 1004 a quick check of the logic (e.g. tautology, conflict, redundancy, etc.) of the one or more parameters input by the user can be performed with any errors being reported to the user (not shown). In preferred embodiments, such logical error checks are performed in near real time in the background and are transparent to the user, alerting the user only if an error occurs.

Reverse Compiler

As earlier mentioned, when a policy auditor wishes to examine an automatically generated XACML policy for its match with the author's intention in one or more security-related parameters, the auditor will run a de-compile function, or a de-compiler, that prepares a near natural language representation of the previously generated XACML code. Preferably, the auditor confirms or manually inputs (e.g. via a cut and paste operation) the auto-generated XACML code to the de-compiler. The de-compiler will automatically generate the original near natural language representation (similar to illustration 1600) and compare this representation to the one or more security-related parameters, as previously noted in step 516 of flow diagram 500. Such an interface for a de-compiler will be described in further detail in the following paragraphs.

Figure 11:
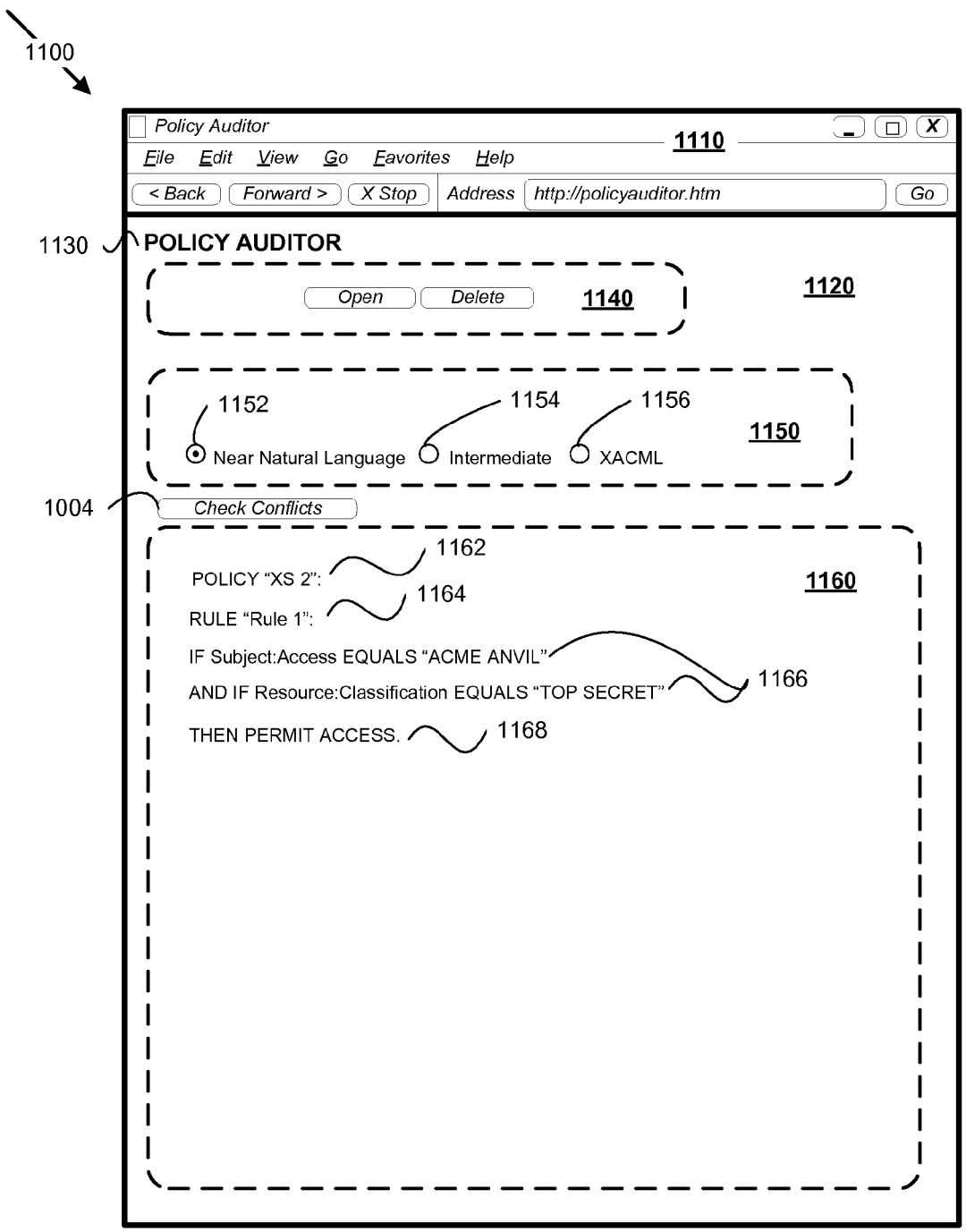
FIG. 11 is an illustration of a graphic user interface providing a policy auditor with a near natural language view window according to an embodiment of the invention.

FIG. 11 is an illustration 1100 of a graphic user interface providing a policy auditor according to an embodiment of the invention. Similar to the policy editor shown in FIGS. 7 through 10, the policy auditor is preferably provided within a web browser 1110 having a browser window 1120. A page title 1130 indicates the policy auditor function of the window. File options in region 1140 provide for the opening of a policy or deletion of a policy.

A region 1150 provides for the selection of various views given a policy being audited, namely a near natural language view button 1152, an intermediate view button 1154 and a XACML code view button 1156. Upon selection of one of the foregoing buttons 1152 through 1156, the representative view will be presented in a region 1160.

As illustrated, a near natural language view of a policy is being displayed in region 1160, namely a policy name 1162, a rule name 1164, one or more rule fragments 1166 and an action identifier 1168. Such a near natural language view in region 1160 provides a ready and reliable comparison, typically to one or more security-related parameters.

Similar to the 1004 button previously discussed in to FIG. 10 on a policy editor screen, such a button 1004 can also provided on a policy auditor screen such as that in illustration 1100, thereby providing a means to manually invoke a human error check or logical error check.

Figure 12:
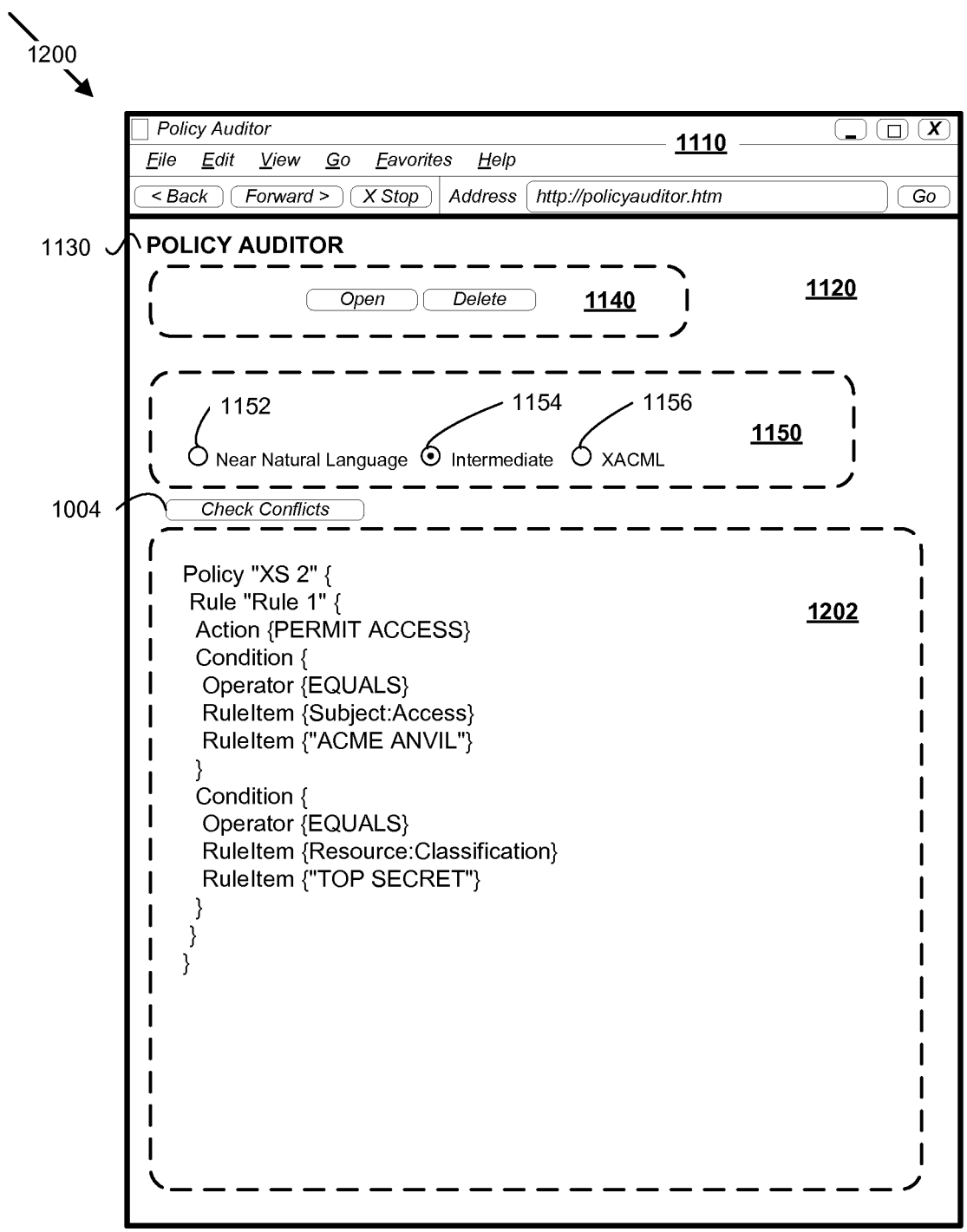
FIG. 12 is an illustration of a graphic user interface providing a policy auditor with an intermediate view window according to an embodiment of the invention.

FIG. 12 is an illustration 1200 similar to illustration 1100, but that of an intermediate view of a given policy within a region 1202 (corresponding to region 1160 in FIG. 11). Such an intermediate view within region 1202 is useful for verification purposes.

Figure 13:
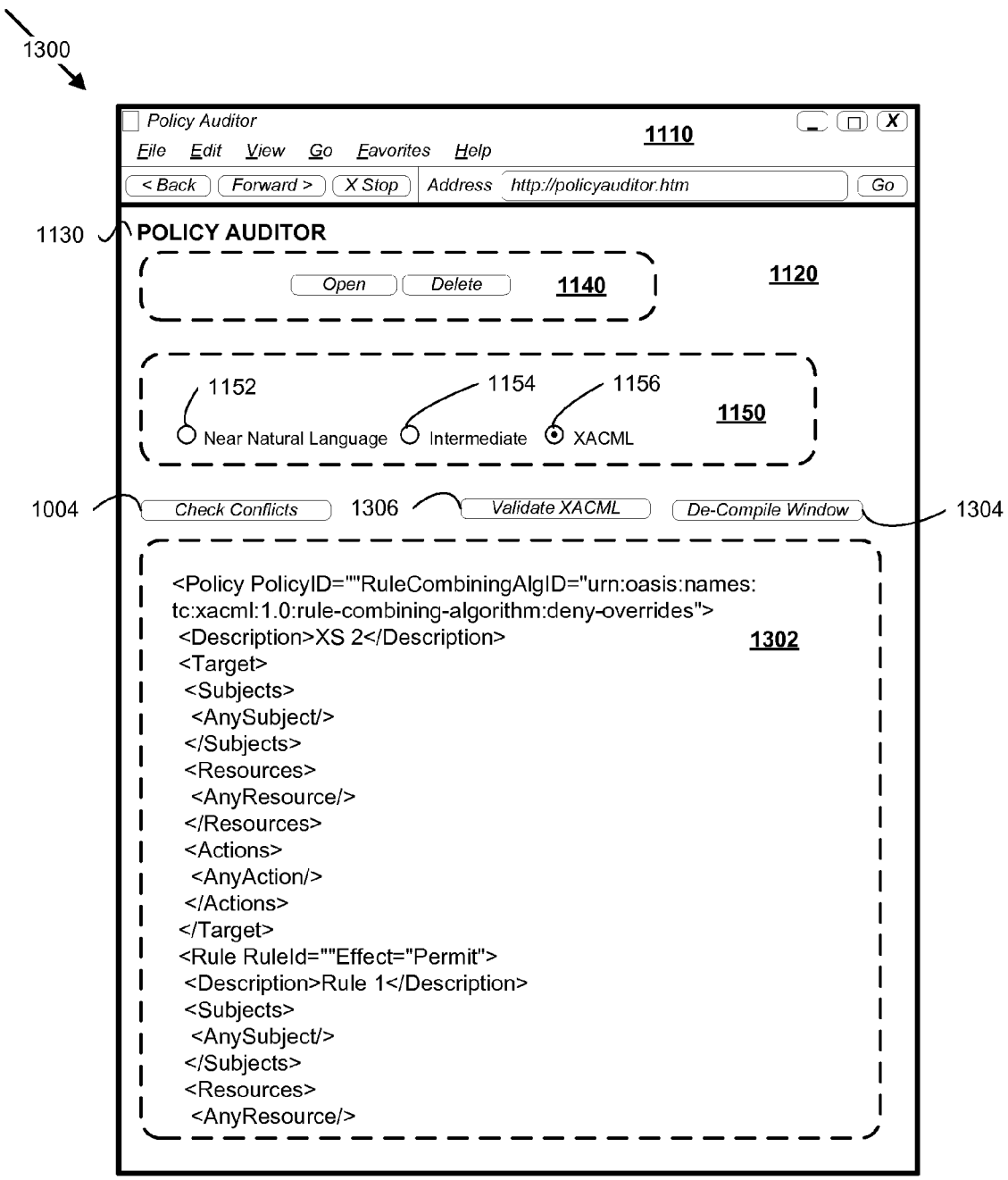
FIG. 13 is an illustration of a graphic user interface providing a policy auditor with a XACML view window according to an embodiment of the invention.

Similarly, FIG. 13 is an illustration 1300 similar to illustrations 1100 and 1200, but that of a XACML code view of a given policy within a region 1302. Preferably the text (raw XACML code) from region 1302 can be copied into the scratchpad or copypad of the computer terminal—such that other operations of de-compilation or verification, or other operations, can be conducted if a literal copy of the XACML code is required.

A button 1304 is preferably provided within or near region 1302, whereby a user can request that the XACML code within region 1302 be de-compiled or reverse compiled. It is further preferable that when the button 1304 is pressed: (i) the XACML code is copied into the scratchpad and (ii) an input dialog or screen for a reverse compile operation is invoked.

As illustrated by button 1306, it can be helpful on selected screens to provide a means to manually allow a user to invoke a validation check of the XACML code to identify syntax errors (e.g. invalid quotation mark or parenthesis, invalid characters, etc.) or other errors in the code, either in conjunction or separately from a button 1004 provided to identify logical errors. By way of example, upon clicking the button 1306 a quick check of syntax of the created XACML code can be performed with any errors being reported to the user (not shown). In preferred embodiments, such error checks are performed in near real time in the background and are transparent to the user, alerting the user only if an error occurs.

Figure 14:
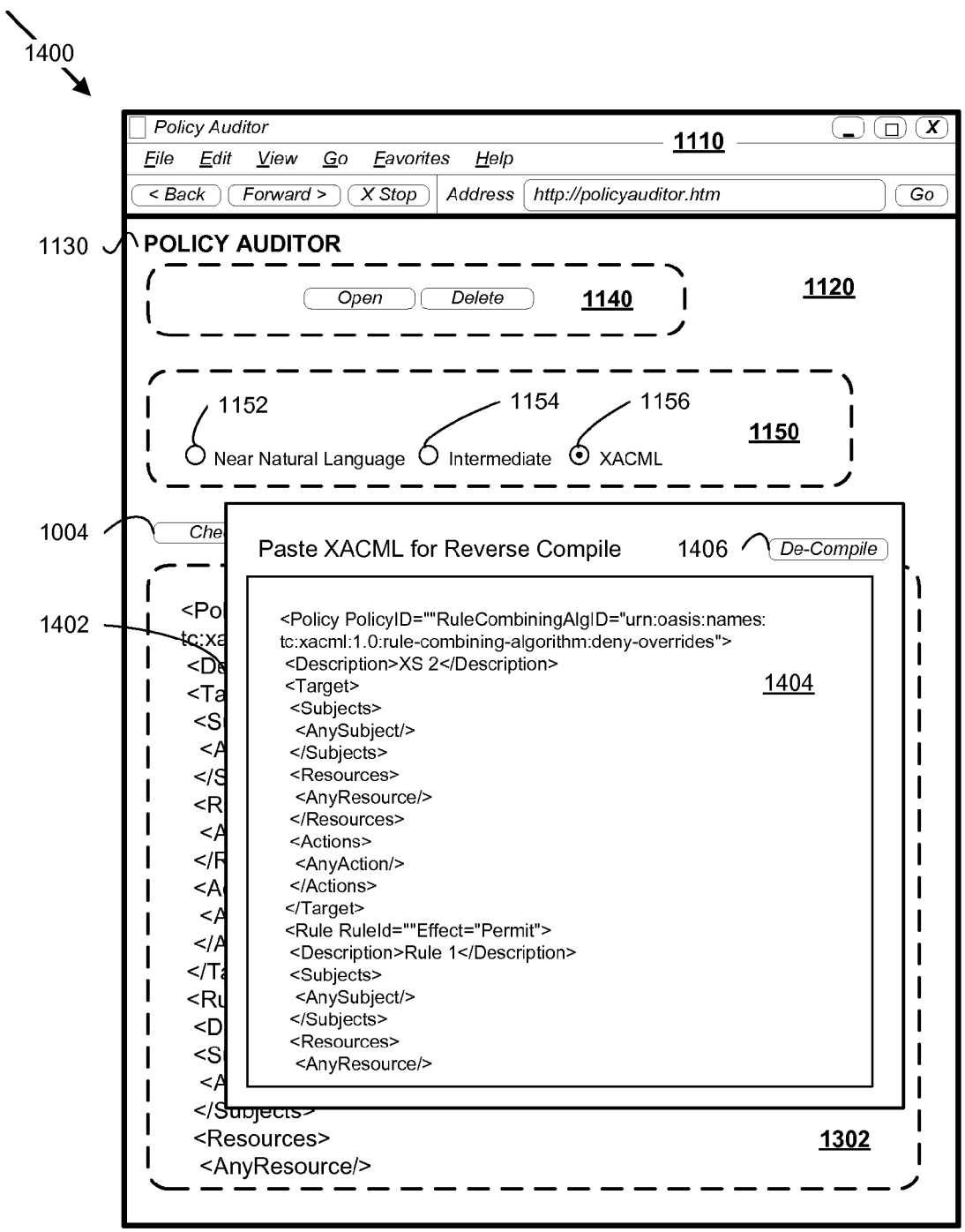
FIG. 14 is an illustration of a graphic user interface providing a reverse compile request according to an embodiment of the invention.

FIG. 14 is such an illustration 1400 of a policy editor having a input dialog 1402 for reverse compiling a XACML code. More particularly, input dialog 1402 comprises an input window 1404 where XACML can be pasted (preferably originating from a copy operation from region 1302 in FIG. 13). Once the XACML is pasted into the input dialog 1404, a de-compile button 1406 is clicked (executed) to direct the XACML compiler to reverse compile the XACML code back into a near natural language representation.

Figure 15:
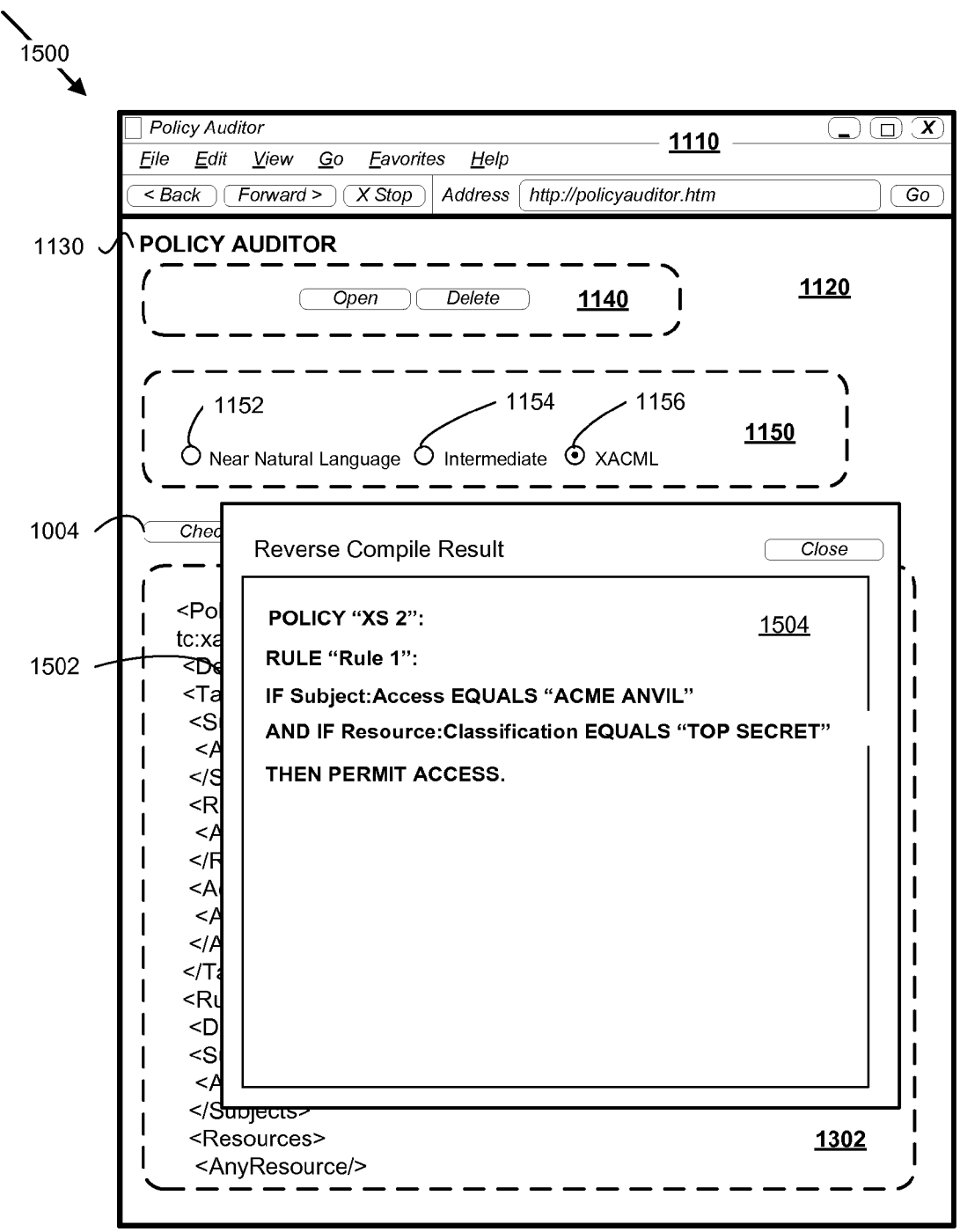
FIG. 15 is an illustration of a graphic user interface presenting a reverse compile result according to an embodiment of the invention.

Turning to FIG. 15, an illustration 1500 depicts a policy auditor having such a near natural language result dialog 1502. More particularly, the result dialog 1502 comprises of a result window 1504 which contains the near natural language representation of the XACML code previously submitted by a reverse compile input dialog (such as 1402 in FIG. 14). The result dialog 1502, in conjunction with the other features described above, provide ample comparison and verification features—such that a policy author can confirm that the one or more security-related parameters have been accurately processed into XACML code for deployment.

Turning to FIG. 20, a diagram 2000 is a top-level illustration of a compile process and a de-compile process. More particularly, using a context-free grammar, such as making selections from pre-determined selections, one or more parameters of a real-world access policy are provided by a user in step 2002. As illustrated, simple drop-down boxes are preferable as an interface, although other graphic user interface controls can be used as well.

Upon completion of the step 2002 of providing parameters, one or more intermediate data structures (and the data populating the structures) are created in step 2004. Namely, these intermediate data structures serve as a temporary data structure for creation of downstream XACML code. Upon completion of step 2004, XACML code is created in step 2006 using the intermediate data structures from step 2004.

If reverse compilation is desirable, the XACML code from step 2006 is provided in step 2008. Preferably, this code is provided by the user (e.g. a cut and paste operation or other partially or wholly independent source) in step 2014 rather than provided by the internal data structures utilized in steps 2002 through 2006. If a manual operation for providing the XACML source code is not used in step 2014, it is desirable that the source XACML code originates from a trusted source and that its authenticity can be verified, (e.g. through digital signatures and digital certificates).

Upon completion of providing the XACML code in step 2008, a second set of intermediate data structures are created in step 2010. Preferably, such a second set of intermediate data structures are not populated nor do they rely upon the first set of intermediate data structures created in step 2004. In preferred embodiments, for example, the first set of intermediate data structures of step 2004 are not read nor serve as a source of data for the second set of intermediate data structures of step 2010.

More particularly, to provide a trusted reverse compilation of the XACML code without any data or functions being provided by the original XACML compilation process, as a matter of policy it is advantageous to destroy all intermediate data structures created and populated during the compilation process, (e.g. those data structures in step 2004). While the reverse compilation process can in fact use similar intermediate data structures or data objects, the actual memory locations for the reverse compilation process should be created and referenced independent from the compilation process. Such destruction of the former compilation data structures, in combination with true independence of processing and data, provides that a reverse de-compilation process is truly exclusive of the original compilation process.

Following the creation of the independent data structures in step 2010, the near natural language representation of the XACML code of step 2008 is created and presented to the user in step 2012. Such near natural language representation created in step 2012 is therefore capable of being compared to the one or more policy parameters provided in step 2002, to ensure that intent and accuracy of the full compilation and reverse compilation process has been achieved.

Computer Implementation

Turning to FIG. 21, a block diagram illustrates a computer 2100 upon which an embodiment of the invention may be implemented. Computer 2100 includes a motherboard 2102 or other communication mechanism for communicating information, and a processor 2104 coupled with motherboard 2102 for processing information. Computer 2100 also includes a memory 2106, such as a random access memory (RAM) or other dynamic storage device, coupled to motherboard 2102 for storing information and instructions to be executed by the processor 2104. Memory 2106 also may be used for storing temporary variables or other intermediate information during execution of instructions to be executed by processor 2104. Computer 2100 further includes a basic input output system (BIOS) 2108 or other static storage device coupled to motherboard 2102 for storing static information and instructions for processor 2104. A storage device 2110, such as a magnetic disk or optical disk, is provided and coupled to bus 2102 for storing information and instructions.

Computer 2100 may be coupled via motherboard 2102 to a monitor 2112, such as a cathode ray tube (CRT) or liquid crystal display (LCD) for displaying information to a computer user. A keyboard 2114, including alphanumeric and other keys is coupled to motherboard 2102 for communicating information and command selections to processor 2104. Another type of user input device is a mouse 2116, such as a mouse, a trackball, or cursor direction keys for communicating direction information and command selections to processor 2104 and for controlling cursor movement on monitor 2112. This input device typically has degrees of freedom in two axes, a first axis (e.g., x) and a second axis (e.g., y), that allows the device to specify positions in a plane.

The invention is related to the use of computer 2100 as a conduit for information transmission with a server 2130. Such information may, by way of example, include information regarding the selection of specific digital content to be purchased, payment information, delivery information or other information necessary to successfully perform the transaction. According to one embodiment of the invention, the information is provided by computer 2100 in response to processor 2104 executing one or more sequences of one or more instructions contained in memory 2106. Such instructions may be read into memory 2106 from another computer-readable medium, such as storage device 2110.

Execution of the sequences of instructions contained in memory 2106 causes processor 2104 to perform the process steps described herein. One or more processors in a multi-processing arrangement may also be employed to execute the sequences of instructions contained in memory 2106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2104 for execution. Such a medium may take many forms, including but not limited to, non-volatile media, volatile media, and transmission media. Non-volatile media includes, for example, optical or magnetic disks, such as storage device 2110. Volatile media includes dynamic memory, such as memory 2106. Transmission media includes coaxial cables, copper wire and fiber optics, including the wires that comprise motherboard 2102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2104 for execution. For example, the instructions may initially be carried on a magnetic disk of a remote computer. Motherboard 2102 carries the data to and from memory 2106, from which processor 2104 retrieves and executes the instructions. The instructions received by memory 2106 may optionally be stored on storage device 2110 either before or after execution by processor 2104.

Computer 2100 also includes a network interface 2118 coupled to motherboard 2102. Network interface 2118 provides a two-way data communication coupling to a network link 2120 that is connected to a local network 2122. For example, network interface 2118 may be a digital subscriber line (DSL) modem, satellite dish, an integrated services digital network (ISDN) card or other data communication connection to a corresponding type of telephone line. As another example, communication interface 2118 may be a local area network (LAN) card effecting a data communication connection to a compatible LAN. Wireless communication means such as internal or external wireless modems may also be implemented.

In any such implementation, network interface 2118 sends and receives electrical, electromagnetic or optical signals that carry digital data streams representing various types of information, such as the selection of goods to be purchased, the information for payment of the purchase, or the address for delivery of the goods. Network link 2120 typically provides data communication through one or more networks to other data devices. For example, network link 2120 may effect a connection through local network 2122 to a an Internet Host Provider (ISP) 2124 or to data equipment operated by ISP 2124. ISP 2124 in turn provides data communication services through the world wide packet data communication network now commonly referred to as the "Internet" 2126. Local network 2122 and Internet 2126 both use electrical, electromagnetic or optical signals that carry digital data streams. The signals through the various networks and the signals on network link 2120 and through network interface 2118, which carry the digital data to and from computer system 2100, are exemplary forms of carrier waves transporting the information.

Computer 2100 can send messages and receive data, including program code, through the network(s), network link 2120 and network interface 2118. In the Internet example, a server 2128 might transmit a requested code for an application program through Internet 2126, ISP 2124, local network 2122 and network interface 2118. In accordance with the invention, one such downloaded application provides for the selection, transaction, payment and delivery of goods as described herein. The received code may be executed by processor 2104 as it is received, and/or stored in storage device 2110, or other non-volatile storage for later execution. In this manner, computer 2100 may obtain application code in the form of a carrier wave.

CONCLUSION

While XACML serves as an exemplary language for embodiments of the present invention as described herein, other embodiments of the present invention can be utilized with other XML or non-XML languages with equal success in other communities of interest (COIs), such as but not limited to healthcare, architecture, engineering, research, mathematics or other COIs. For example, embodiments of the present invention can serve as a liaison between a human user and other XML languages or non-XML languages, thus affording a near natural language interface, compiler and de-compiler for a variety of other languages in addition to XACML. In preferred embodiments of the present invention, the natural language interface relies on a database for its specific pre-defined selections, thus the form and function of embodiments of the present invention can be readily deployed in other COIs with the modification of a database.

Unless otherwise indicated, all numbers expressing quantities used in the specification and claims are to be understood as being modified in all instances by the term "about" or "approximately." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. If specific results of any tests are reported in the technical disclosure, any numerical value inherently can contain certain errors necessarily resulting from the standard deviation found in the respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as", "in the case", "by way of example") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Preferred embodiments of this invention are described herein, including the best mode known to the inventors for carrying out the invention. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, if any references have been made to patents and printed publications in this specification, then each of the above cited references and printed publications, if any, are herein individually incorporated by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A computer-implemented method for the development of an Extensible Access Control Markup Language (XACML) access policy representing a real-world access policy, comprising the steps of:
   providing one or more security-related parameters specifying the real-world access policy;
   inputting the one or more security-related parameters via a near natural language interface;
   creating one or more intermediate data structures from the one or more security-related parameters;
   generating an XACML access policy from the one or more intermediate data structures; and
   generating, using at least the XACML access policy, a near natural language representation of the XACML access policy to verify consistency with the one or more security-related parameters.

2. The computer-implemented method of claim 1, wherein the near natural language interface utilizes a context-free grammar.

3. The computer-implemented method of claim 1, wherein the near natural language interface utilizes constrained English.

4. The computer-implemented method of claim 1, wherein the step of inputting the one or more security-related parameters via a near natural language interface is performed by selecting from one or more pre-defined selections.

5. The computer-implemented method of claim 1, further comprising the step of:
   checking the input of the one or more security related parameters by logical error detection of one or more from the set consisting of: tautology, conflict and redundancy.

6. The computer-implemented method of claim 1, wherein the step of generating a near natural language representation of the XACML access policy does not require access to the one or more intermediate data structures.

7. The computer-implemented method of claim 1, further comprising the step of destroying the one or more intermediate data structures prior to performing the steps of generating a near natural language representation of the XACML access policy.

8. The computer-implemented method of claim 1, further comprising the step of:
   creating a second set of one or more independent data structures from the XACML access policy prior to the step of generating a near natural language representation of the XACML access policy.

9. The computer-implemented method of claim 1, further comprising the step of:
   comparing the near natural language representation of the XACML access policy to the one or more security-related parameters.

10. The computer-implemented method of claim 1, further comprising the step of:
    a security officer comparing the near natural language representation of the XACML access policy to the one or more security-related parameters to determine the trustedness of the XACML access policy.

11. A computer-readable memory device for the development of the XACML access policy, the computer-readable memory device carrying one or more sequences of one or more instructions, which when executed by one or more processors, cause the one or more processors to perform the computer-implemented method of claim 1.

12. An apparatus for the development of the XACML access policy, comprising:
    one or more processors; and
    a memory communicatively coupled to the one or more processors, the memory including one or more sequences of one or more instructions which, when executed by the one or more processors, cause the one or more processors to perform the computer-implemented method of claim 1.

13. A system for the development of an Extensible Access Control Markup Language (XACML) access policy, comprising:
    one or more processors;
    a graphic user interface running on the one or more processors for the inputting of one or more security-related parameters in a near natural language expressions;
    a compiler running on the one or more processors to parse the near natural expressions, create intermediate data structures and create an XACML access policy; and
    a de-compiler running on the one or more processors to de-compile the XACML access policy and create, using at least the XACML access policy, a near natural language representation for comparison to the one or more security-related parameters.

14. A method for preparing an item of information and implementing an access policy, comprising:
    tagging the item of information with one or more tags;
    compiling an Extensible Access Control Markup Language (XACML) access policy, wherein one or more security-related parameters specifying a real-world access policy are provided via a near natural language interface;
    after compiling the XACML access policy, de-compiling, using the XACML access policy, the XACML access policy into a near natural language representation to verify consistency with the one or more security-related parameters;
    requesting an item of information via a requestor having one or more credentials; and
    transforming the item of information based on the one or more credentials and the XACML access policy.

* * * * *

UNITED STATES PATENT AND TRADEMARK OFFICE
CERTIFICATE OF CORRECTION

PATENT NO. : 8,532,978 B1  
APPLICATION NO. : 12/263307  
DATED : September 10, 2013  
INVENTOR(S) : Ronald C. Turner Page 1 of 1

It is certified that error appears in the above-identified patent and that said Letters Patent is hereby corrected as shown below:

Title Page, Item (73) Assignee information "AFRL/RIJ, Rome, NY (US)" should read "NONE"

Signed and Sealed this  
Twenty-second Day of April, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,532,978 B1  Page 1 of 1
APPLICATION NO. : 12/263307
DATED : September 10, 2013
INVENTOR(S) : Ronald C. Turner It is certified that error appears in the above-identified patent and that said Letters Patent is hereby corrected as shown below:

Title Page, "Item (75)" should read "Item (76)"

Title Page, Item (73) Assignee information "AFRL/RIJ, Rome, NY (US)" should read "NONE"

This certificate supersedes the Certificate of Correction issued April 22, 2014.

Signed and Sealed this
Thirteenth Day of May, 2014

Michelle K. Lee
*Deputy Director of the United States Patent and Trademark Office*